US011590501B2

(12) United States Patent
Swami et al.

(10) Patent No.: US 11,590,501 B2
(45) Date of Patent: Feb. 28, 2023

(54) METHODS FOR ISOLATING PANCREATIC ISLETS

(71) Applicant: University of Virginia Patent Foundation, Charlottesville, VA (US)

(72) Inventors: Nathan Swami, Charlottesville, VA (US); Walter Varhue, Charlottesville, VA (US); Linda W. Langman, Crozet, VA (US); Kenneth Brayman, Charlottesville, VA (US); Shayn Peirce-Cottler, Charlottesville, VA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 0 days.

(21) Appl. No.: 17/445,972

(22) Filed: Aug. 26, 2021

(65) Prior Publication Data
US 2022/0048030 A1 Feb. 17, 2022

Related U.S. Application Data

(63) Continuation of application No. 16/095,097, filed as application No. PCT/US2017/028607 on Apr. 20, 2017, now abandoned.
(Continued)

(51) Int. Cl.
*B01L 3/00* (2006.01)
*G01N 15/02* (2006.01)
*G01N 15/00* (2006.01)

(52) U.S. Cl.
CPC ... *B01L 3/502753* (2013.01); *B01L 3/502776* (2013.01); *G01N 15/0255* (2013.01);
(Continued)

(58) Field of Classification Search
CPC ........ G01N 2015/0065; G01N 15/0255; B01L 2300/0864; B01L 2300/0816;
(Continued)

(56) References Cited

U.S. PATENT DOCUMENTS

2004/0072278 A1* 4/2004 Chou ................. G01N 15/1468
436/63
2008/0185057 A1* 8/2008 Prakash ............... G01N 1/2035
137/594
(Continued)

FOREIGN PATENT DOCUMENTS

WO 2017184854 10/2017

OTHER PUBLICATIONS

"International Application Serial No. PCT/US2017/028607, International Search Report dated Jul. 18, 2017", 2 pgs.
(Continued)

*Primary Examiner* — Samuel P Siefke
*Assistant Examiner* — Tingchen Shi
(74) *Attorney, Agent, or Firm* — Schwegman Lundberg & Woessner, P.A.

(57) ABSTRACT

A microfluidic device can include an upstream passage, a sample passage, a bifurcating passage, and a combining passage. The upstream passage can be configured to provide a focusing stream. The sample passage can be configured to provide a sample stream. The bifurcating passage can include a specified bifurcating flow resistance. The combining passage can be configured to create a combined stream from the focusing stream and the sample stream, where the focusing stream can direct the sample stream away from the upstream passage and toward the bifurcating passage. A first portion of the combined stream can be discharged through the bifurcating passage. The main discharge can be configured to discharge a second portion of the combined stream.
(Continued)

The main discharge can include a main discharge resistance that is selectable to vary the main discharge resistance relative to the bifurcating flow resistance.

20 Claims, 15 Drawing Sheets

Related U.S. Application Data

(60) Provisional application No. 62/324,938, filed on Apr. 20, 2016.

(52) U.S. Cl.
CPC ............. *B01L 2200/0652* (2013.01); *B01L 2300/0816* (2013.01); *B01L 2300/0864* (2013.01); *B01L 2400/086* (2013.01); *G01N 2015/0065* (2013.01)

(58) Field of Classification Search
CPC ....... B01L 2200/0652; B01L 3/502776; B01L 3/502753
See application file for complete search history.

(56) References Cited

U.S. PATENT DOCUMENTS

| | | | | |
|---|---|---|---|---|
| 2009/0286300 | A1* | 11/2009 | Le Vot ................ | B01F 33/3011 435/308.1 |
| 2012/0061305 | A1 | 3/2012 | Quake et al. | |
| 2013/0203061 | A1 | 8/2013 | Kuslich et al. | |
| 2014/0113324 | A1* | 4/2014 | Di Carlo ............ | G01N 15/1404 435/29 |
| 2014/0230909 | A1* | 8/2014 | Di Carlo ................ | F15D 1/14 137/628 |
| 2015/0226657 | A1* | 8/2015 | Foster ..................... | G01N 15/10 422/527 |
| 2016/0016169 | A1* | 1/2016 | Ben-Yakar ........ | B01L 3/502738 506/40 |
| 2016/0022899 | A1* | 1/2016 | Aljohani ................ | A61K 38/26 623/11.11 |
| 2020/0353469 | A1 | 11/2020 | Swami et al. | |

OTHER PUBLICATIONS

"International Application Serial No. PCT/US2017/028607, Written Opinion dated Jul. 18, 2017", 7 pgs.

"International Application Serial No. PCT/US2017/028607, International Preliminary Report on Patentability dated Nov. 1, 2018", 9 pgs.

"U.S. Appl. No. 16/095,097, Non Final Office Action dated Jan. 14, 2021", 19 pgs.

"U.S. Appl. No. 16/095,097, Response filed May 14, 2021 to Non Final Office Action dated Jan. 14, 2021", 15 pgs.

"U.S. Appl. No. 16/095,097, Final Office Action dated May 28, 2021", 17 pgs.

"U.S. Appl. No. 16/095,097, Response filed Jul. 28, 2021 to Final Office Action dated May 28, 2021", 13 pgs.

"U.S. Appl. No. 16/095,097, Advisory Action dated Aug. 10, 2021", 4 pgs.

Chen, X., "Microfluidic cell separation chips based on crossflow filtration", Sensors and Actuators B 130, (2008), 6 pgs.

Kuo, J.S., "Deformability considerations in filtration of biological cells", Lab Chip 2010,10 (7), (2010), 837-842.

McFaul, S.M., "Cell separation based on size and deformability using microfluidic funnel ratchets", Lab Chip 2012, 12 (13), (2012), 2369-2376.

Myrand-Lapierre, M.E., "Multiplexed fluidic plunger mechanism for the measurement of red blood cell deformability", Lab Chip 2015,15 (1), (2015), 159-167.

Nam, K.H., "Size-based separation and collection of mouse pancreatic islets for functional analysis", Biomedical Microdevices, vol. 12, (2010), 865-874.

Otto, O., "Real-time deformability cytometry: on-the-fly cell mechanical phenotyping", Nat Methods 2015, 12 (3), (2015), 8 pgs.

Yamada, M., "Hydrodynamic filtration for on-chip particle concentration and classification utilizing microfluidics", Lab on a Chip, vol. 5, (2005), 1233-1239.

\* cited by examiner

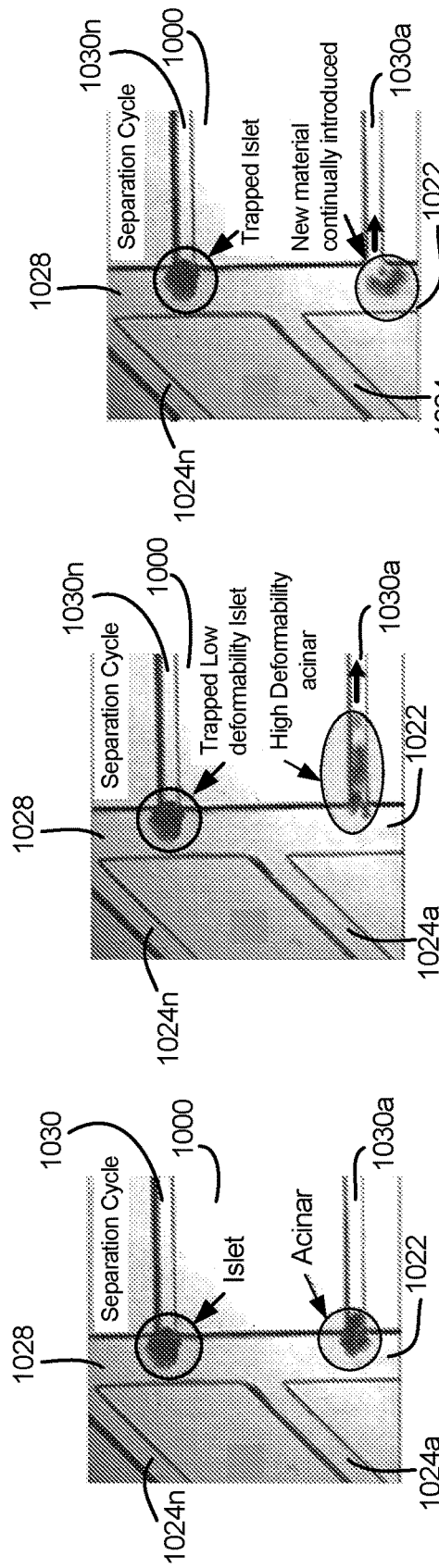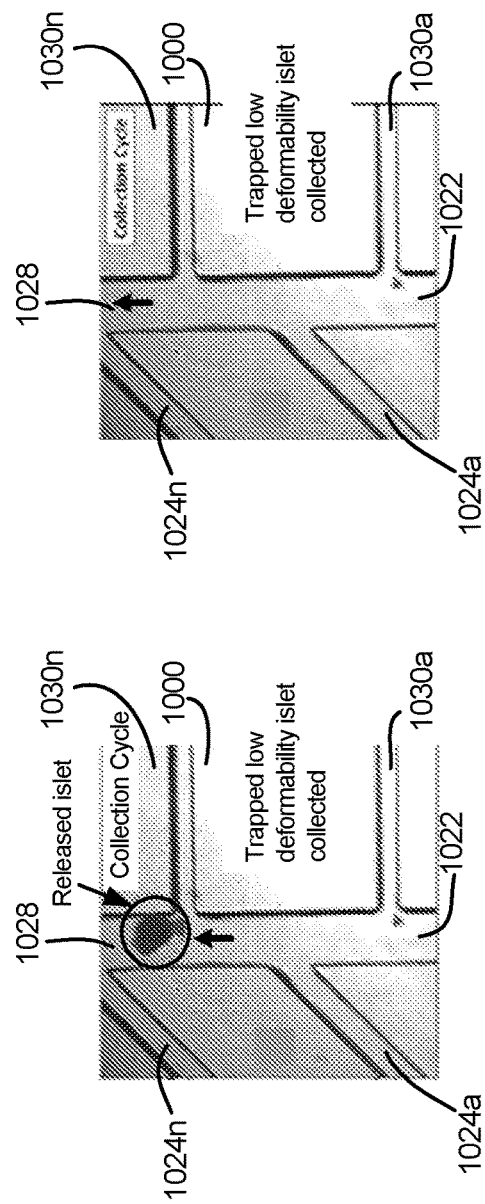

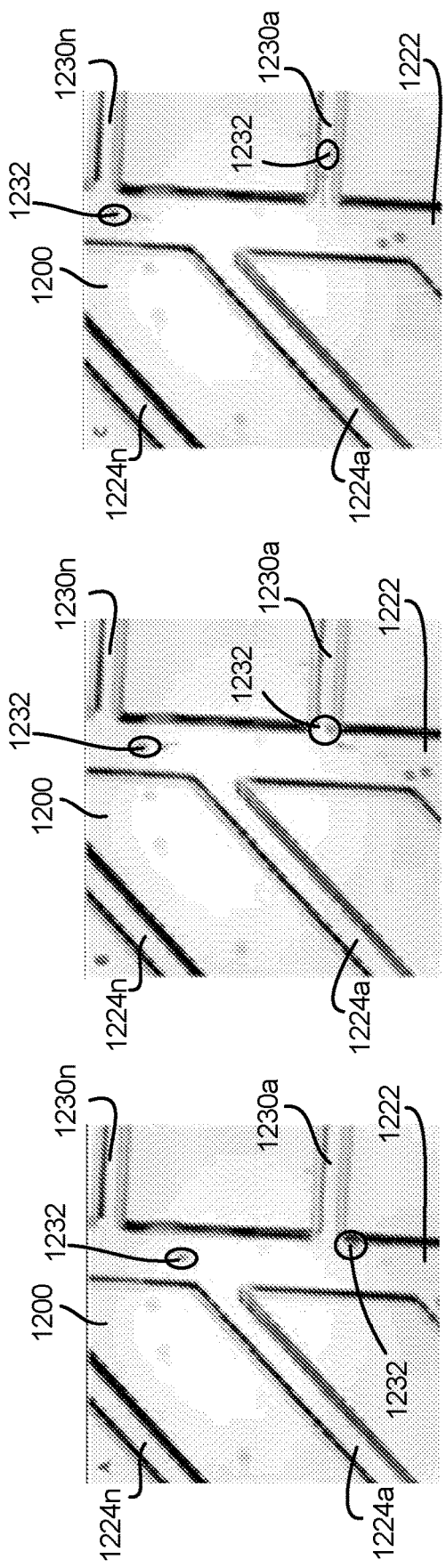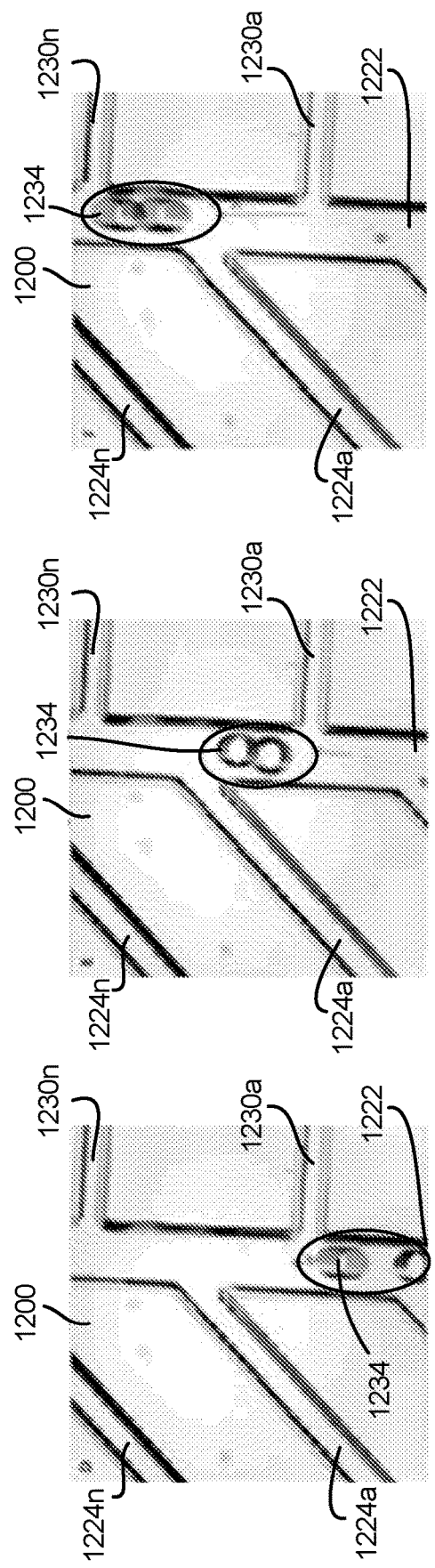

METHODS FOR ISOLATING PANCREATIC ISLETS

CLAIM OF PRIORITY

This patent application is a continuation of U.S. patent application Ser. No. 16/095,097, filed on Oct. 19, 2018, which is a U.S. National Stage Filing under 35 U.S.C. 371 from International Application No. PCT/US2017/028607, filed on Apr. 20, 2017, and published as WO 2017/184854, which claims the benefit of priority to Swami et al., U.S. Provisional Patent Application Ser. No. 62/324,938, entitled "SYSTEMS AND METHODS FOR ISOLATING AND TRANSPLANTING PANCREATIC ISLETS," filed on Apr. 20, 2016, which are hereby incorporated by reference herein in their entirety.

BACKGROUND

Type 1 Diabetes (T1D) is a major cause of morbidity and mortality worldwide. In 2012, an estimated $245 billion dollars was spent treating and managing diabetes in the United States. This constitutes a 40% increase in cost related to the disease from five years earlier with an estimated $174 billion spent in 2007. The costs associated with T1D treatment and management are typically higher on a per case basis than those due to Type 2 Diabetes (T2D). In many cases, long term management of T1D is achieved through lifelong exogenous insulin administration used to synthetically regulate blood glucose and achieve energy homeostasis. However, while this therapy may generally prevent or even reverse long-term T1D complications in some patients, it often fails to replicate the necessary sensitivity towards glucose regulation, as achieved by a healthy pancreatic endocrine function, thereby leaving subjects vulnerable to severe episodes of hypoglycemia and hyperglycemic unawareness.

While no long-term cure exists for T1D, transplantation of pancreatic islet of Langerhans has demonstrated the ability to restore a patient's endocrine function for short periods, typically up to five years. However, many current methods for isolating pancreatic islets result in only partial sample purification and substantial loss of transplant material.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIGS. 10A-10E illustrate operations of a microfluidic device, in accordance with at least one example of the present disclosure.

FIGS. 12A-12F illustrate operations of a microfluidic device, in accordance with at least one example of the present disclosure.

DETAILED DESCRIPTION

Figure 1:
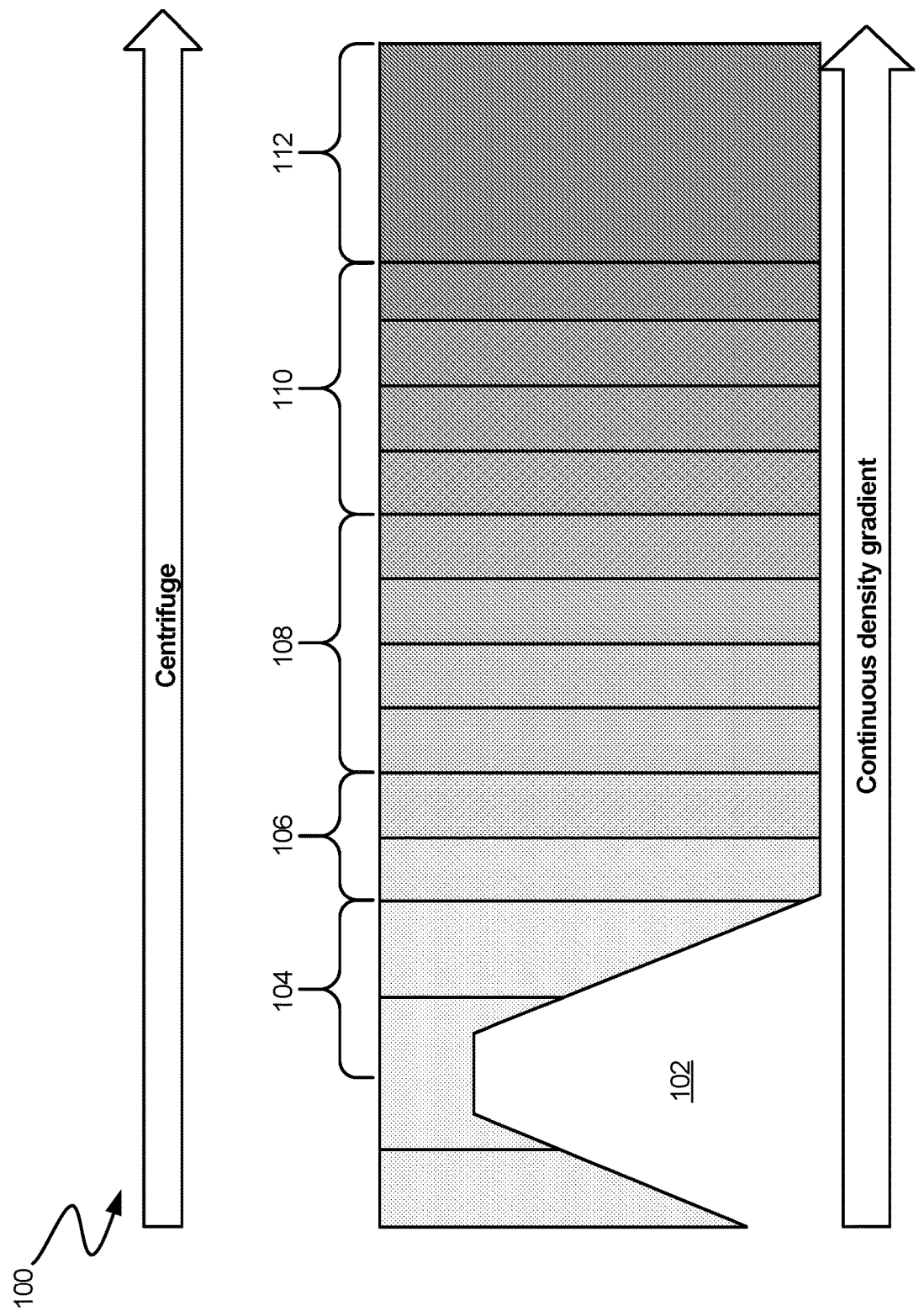
FIG. 1 illustrates a schematic view of a process, in accordance with at least one example of the present disclosure.

The inventors have recognized, among other things, that while no long-term cure exists for T1D, transplantation of pancreatic islet of Langerhans has demonstrated the ability to restore a patient's endocrine function for short periods, typically up to five years. However, some current methods for isolating pancreatic islets result in only partial sample purification and substantial loss of transplant material. On average, there is estimated to be around 2 million pancreatic islets within a healthy set of human pancreas. Some currently used isolation techniques result in an islet yield of around 800,000 useable islets, suggesting a potential loss of over 50% of transplantable islet material. Because this isolation method uses a density gradient to separate islet material from contaminant acinar tissue, the separated islets are not selected based on their functional quality or beta cell viability, which are of paramount importance within their downstream transplant application. On one hand, the discarded samples from this method can include large numbers of viable islets with high membrane and mitochondrial integrity that present high revascularization potential after transplantation, but are discarded due to the difficulty in separating them from acinar tissue. On the other hand, the collected sample exhibits a high degree of variability in islet quality due to size-based differences in islet functionality and due to presence of a significant proportion (~30%) of acinar tissue, thereby causing an invasive transplant procedure due to its higher volume, as well as enhancing its susceptibility to immune cell invasion. Together, these problems substantially increase the islet transplant costs and exacerbate immune rejection.

In some examples, the present subject matter can provide a solution to this problem, such as by using a microfluidic approach that utilizes the microscale differences in the deformability and hydrodynamic flow streamlines to cause selective flow displacements of particular cell aggregates for enabling:

(i) separation of islets versus acinar tissue;
(ii) separation of small versus large islets;
(iii) separation of cell aggregates based on viability; and
(iv) construction of transplants with spatially patterned architectures of cell aggregates.

Disclosed herein are systems, compositions, and methods for separation modalities under crossflow and hydrodynamic displacement and two-cycle separation that allow for collection of islets integration with the collection systems with three-dimensional (3D) bio-printing. In some examples, these methodologies can be useful for isolating high value islets and for construction of transplants with patterned architectures.

This overview is intended to provide an overview of subject matter of the present patent application. It is not intended to provide an exclusive or exhaustive explanation of the present subject matter. The detailed description is included to provide further information about the present patent application.

Microfluidic Devices Microfluidic separation methods rely on selective particle displacements under the well-determined laminar flow streamlines that exist within microfluidic systems due to their low dimensionless Reynolds number (ratio of inertial and viscous forces under flow, as per Eq. 1) and Stokes number (factor describing how quickly a particle will react to changes in the carrier stream, as per Eq. 2):

$$Re = (U^* D_h)/\nu \quad \text{Equation 1}$$

Here, U is the average fluid velocity, D is the characteristic dimension of a channel or obstacle, and $\nu$ is the kinetic viscosity ($10^{-6}$ m$^2$/s for water). Laminar flow occurs in cases wherein the Re drops below a threshold value ($Re_{trans}$) for a given circumstance, with a $Re_{trans}$ range of 1,000 to 2,000 for fluid flowing through a channel and 65 to 100 for a fluid flowing around an object. The Stokes number of a pipe can be given by:

$$St = ((P_p^* a^2)/18^*\mu)/(D_h/U) \quad \text{Equation 2}$$

Here, a is the diameter of the particle, $P_p$ is the density of the particle, $D_h$ is the hydraulic diameter, and $\mu$ is the viscosity of the carrier fluid. In cases of low stokes numbers the particle will react rapidly to changes in its carrier stream. In the case of flows through microfluidic systems Reynolds numbers are typically extremely low due to the small geometric dimensions of the channels, usually ranging between 1 and $10^{-4}$. Similarly, in the case of microparticles, such as cells or other bio-colloids, the Stokes numbers are also typically low. In cases where the Re of the carrier fluid flow and the St of the particle are small, the trajectory of a particle will follow the streamline of the flow passing through its center of gravity. Utilizing these phenomena, three broad mechanisms of separation are available. These are separations utilizing: (i) particle to wall interactions, (ii) particle to flow interactions, and (iii) particle to force field interactions. Methods utilizing the particle to wall mechanism rely on interaction with rigid structures within the microfluidic device.

These interactions may be used to exert a deterministic force on a particle, thereby achieving separation through selective particle displacement, based on parameters such as particle size or deformability so that particles can be separated and or collected, as discussed below.

FIG. 1 illustrates a schematic view of process 100, in accordance with at least one example of the present disclosure. FIG. 1 shows centrifuge 102, low density waste 104, low density low purity islets 106, mid density high purity islets 108, high density low purity islets 110, and high density acinar waste 112.

Centrifuge 102 can be a device configured to separate particles of varying density. In operation of some examples, tissue samples can be loaded into a process bag centrifuge 102 and spun, for example at 3000 rpm for 5 minutes. During this time, centrifugal force can separate digested aggregates along a density gradient, as shown in FIG. 1.

As a result, denser acinar material can move to the outer regions of the process bag, as indicated by reference numeral 112 and the lower density islet material can move towards the center of the process bag, as indicated by reference numeral 104. The contents of the process bag can then be further separated into 12 fractions, for example of 25 milliliters, where medium size and density particles can be collected in sections 106, 108, 110. The remaining volume in the process bag after separation can be discarded. The collected fractions can be evaluated for islet purity and volume of packed tissue. In some examples, collected fractions of similar purity can be combined into three different groups of varying purity levels: high (fractions above 80% purity); medium (80%-50%); and low (50%-30%), while the discarded sample contains less than 20% purity. The collected fractions can be used in the methods and systems described herein.

Figure 2:
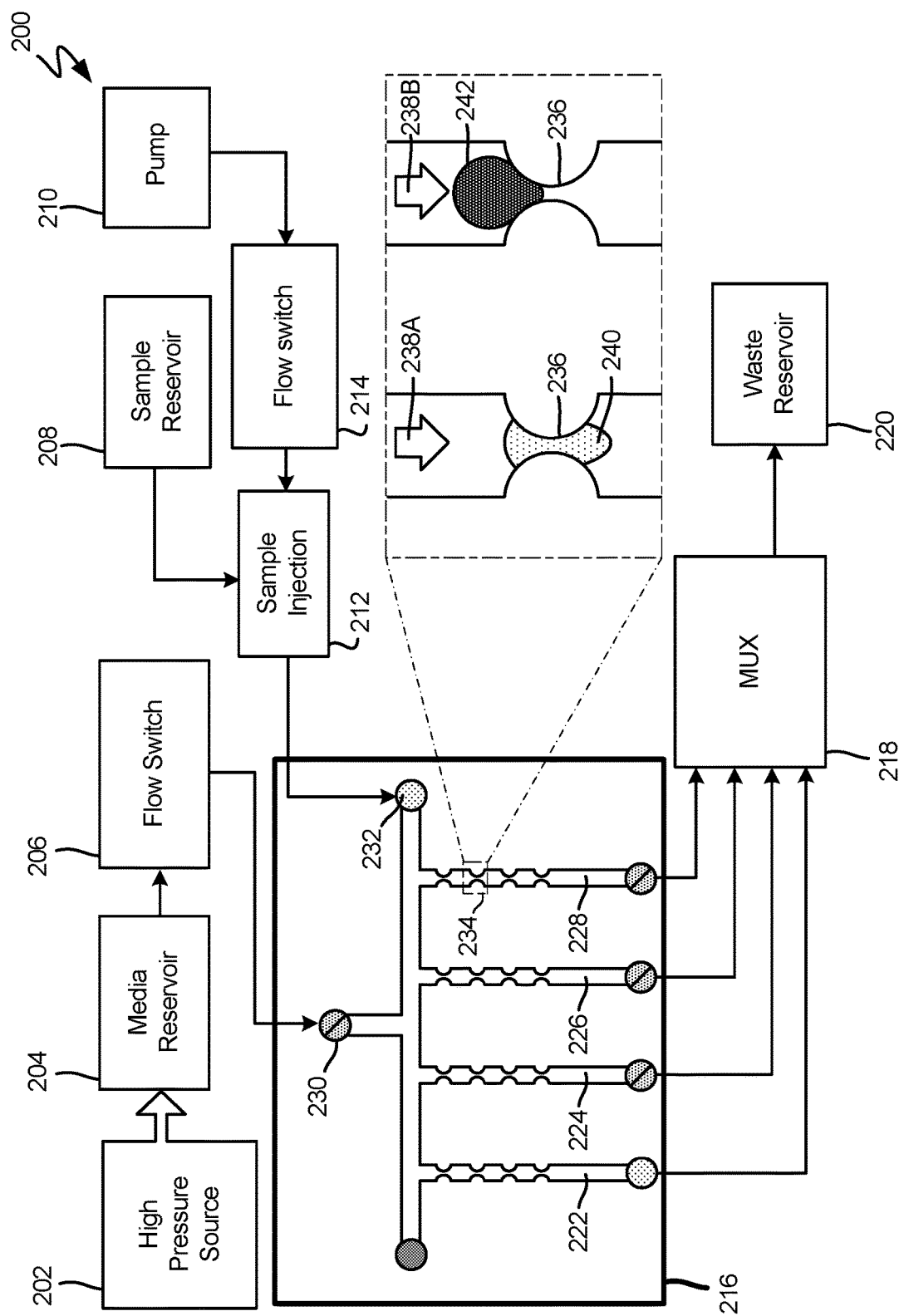
FIG. 2 illustrates a schematic view of a system, in accordance with at least one example of the present disclosure.

FIG. 2 illustrates a schematic view of system 200, in accordance with at least one example of the present disclosure. System 200 can include high pressure source 202, media reservoir 204, flow switch 206, sample reservoir 208, pump 210, sample injection 212, flow switch 214, test device 216, multiplexer 218, and waste reservoir 220. Test device 216 can include channels 222, 224, 225, and 228. Test channel 228 can include media inlet 230, sample inlet 232, focused portion 234, which shows channel 228 in two conditions. Channel 228 can include restriction 236, which can receive flows 228A and 228B. Flow 228A can carry particle 240 and flow 228B can carry particle 242.

High pressure source 202 can be a pump or other pressurization device configured to pressurize media reservoir 204. Flow switch 206 can be an on/off flow switch, such as a flow control valve, such as a butterfly control valve, piezo-electric switch, rotary valve, or a modulating ball control valve. Flow switch 206 can be connected to media inlet 230. Pump 216 can be a pump or other pressurization device configured to pressurize sample injection 212 via flow switch 214. Sample reservoir 208 can be a container or reservoir of sample tissue injectable into sample injection 212 via an independent pump or via pump 210 (for example using an aspirator arrangement). Sample injection 212 can be connected to sample inlet 232.

Testing device 216 can include media inlet 230, which can connect to an inlet orthogonal to sample inlet, such that a sample stream is distributed across a header or manifold orthogonally to media inlet 230. Channels 222-228 can each be connected to the manifold to receive a combination of the media stream and the sample stream. A discharge of each of channels 222-228 can be individually connected to multiplexer 218, which can connect to waste reservoir 220.

Each of channels 222-228 can each have a size or diameter, such as 400 micrometers, in some examples, and each of channels 222-228 can include one or more restrictions. As shown in focused portion 234, channel 228 can include restriction 236, which can have a size or dimeter, for example, of 80 micrometers. In some examples restriction 236 can be approximately 80% of a diameter of acinar material. In other examples, restriction 236 can be of other sizes, such as 10 micrometers to 200 micrometers. For example, the restrictions of channel 222 can be 60 micrometers, the restrictions of channel 224 can be 70 micrometers, and the restrictions of channel 226 can be 90 micrometers. In one example, an optimal device was determined to be a channel with 400 micrometers of width and 350 micrometers of height, with a restriction of 80 micrometers that represents 80% of a smallest islet diameter in a lateral dimension and 150% of a largest islet diameter in a vertical dimension, thereby ensuring no more than 75% occlusion in the restriction.

In operation of some examples, a sample stream can be delivered to sample inlet 232 and a media stream can be delivered to media inlet 230 to direct the sample stream flow. Which of channels 222-228 is used to receive a stream is determined by multiplexer 218, which can act as a multi-way switch to select which of channels 222-228 is open. In one example, such as shown in focused portion 234, stream 238A can carry a deformable particle, such as an acinar 240, which can deform to fit through restriction 236. As also shown in focused portion 234, islet 242 cannot fit through restriction 236. This can be an indication that the size of restriction 236 is a good size to perform separation of deformable acinar particles from non-deformable islets.

In some examples, system 200 can be used to determine an ideal restriction size for use in a microfluidic separation system that separates islets and acinar material based on deformability, in some examples. In some examples, system 200 can be used to determine a restriction size that is specific to the islet and acinar tissues of a specific donor pancreas.

Figure 3:
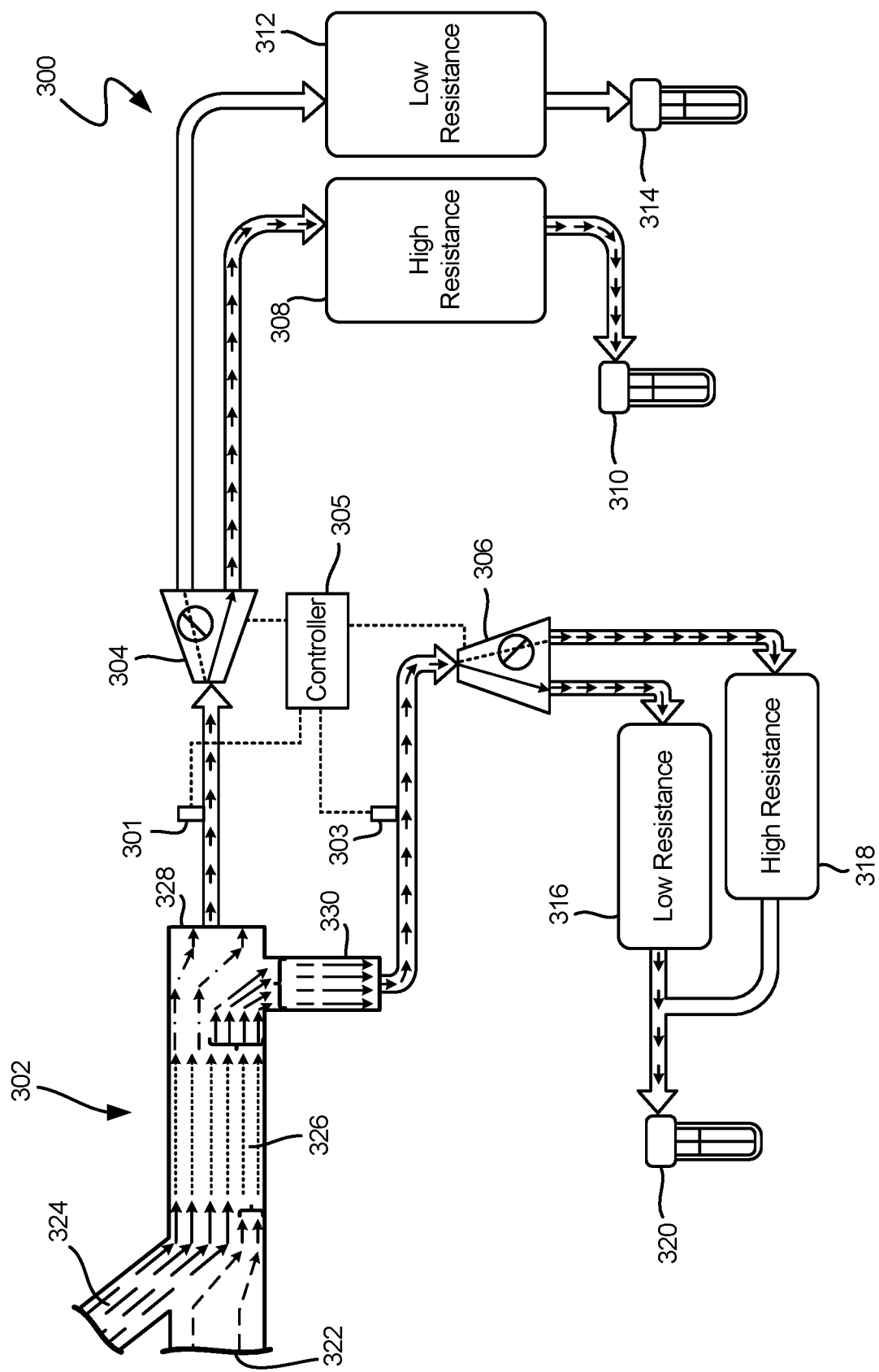
FIG. 3 illustrates a schematic view of another system, in accordance with at least one example of the present disclosure.

FIG. 3 illustrates a schematic view of system 300, in accordance with at least one example of the present disclosure. System 300 can include microfluidic device 302, main discharge multiplexer 304, bifurcating multiplexer 306, high resistance source 308, waste reservoir 310, low resistance source 312, islet reservoir 314, low resistance source 316, high resistance source 318, and acinar waste reservoir 320. Microfluidic device 302 can include sample passage 322, upstream passage 324, combining passage 326, main discharge 328, and bifurcating passage 330. System 300 can also include main discharge sensor 301, bifurcating passage sensor 303, and controller 305.

Main discharge multiplexer 304 and bifurcating multiplexer 306 can be multiplexers or other switching devices configured to selectively switch the connection of an inlet to multiple outlets. In some examples, multiplexer 304 and bifurcating multiplexer 306 can include fast-acting piezoelectric switches for switching between connections of their respective inputs to different respective outputs. Main discharge multiplexer 304 can be connected to a downstream side of main discharge 328. A downstream side of main discharge multiplexer 304 can be connected to high resistance source 308 and low resistance source 312. High resistance source 308 can be connected to waste reservoir 310 and low resistance source 312 can be connected to islet reservoir 314.

Bifurcating multiplexer 306 can be connected in parallel to a downstream side of bifurcating passage 330. A downstream side of bifurcating multiplexer 306 can be connected in parallel to low resistance source 316 and high resistance source 318. Each of low resistance source 316 and high resistance source 318 can be connected to acinar waste reservoir 320.

Each of high resistance source 308 and high resistance source 318 can be a source used to impose a high resistance or pressure drop therethrough. High resistance sources 308 and 318 can be adjustable (for example valves) in some examples, and can be non-adjustable pressure-inducing devices in other examples, such as permeable membranes and line restrictions. Low resistance source 312 and low resistance source 316 can also be adjustable valves in some examples and can be non-adjustable devices in other examples. In some examples, low resistance source can be an open line.

Waste reservoir 310, islet reservoir 314, and acinar waste reservoir 320 can be reservoirs configured to receive and store fluid, such as flasks, bottles, beakers, hermetic containers, and the like.

Microfluidic device can include sample passage 322 configured to receive a sample stream and delver the sample stream to combining passage 326, which can be downstream of sample passage 322. Upstream passage 324 can be configured to receive a focusing stream and provide the focusing stream to combining passage 326, which can be downstream of upstream passage. Focusing stream can direct the sample stream towards bifurcating passage 330, as discussed further below. The focusing stream and sample stream combine in combining passage 326 to form a combined stream. Main discharge 328 can be configured to discharge a portion the combined stream, and bifurcating passage 330 can be configured to discharge another portion of the combined stream, as discussed further below.

Main discharge sensor 301 and bifurcating passage sensor 303 can be sensors configured to measure conditions of main discharge 328 and bifurcating passage 330, respectively, and produce signals based on the measured conditions. Each of main discharge sensor 301 and bifurcating passage sensor 305 can be in communication with controller 305. Main discharge sensor 301 can be coupled to, and in some cases in fluid communication with, main discharge 328 or a header or line downstream thereof. Bifurcating passage sensor 303 can be coupled to, and in some cases in fluid communication with, bifurcating passage 330 or a header or line downstream thereof.

Controller 305 can be a computing device, such as a handheld computer, for example, a smart phone, a tablet, a laptop, a desktop computer, or any other computing device including a processor and wired or wireless communication capabilities. Controller 305 can include or can be connected to a user interface and/or an input device. In some examples, a user interface can be a monitor, keyboard, and mouse in one example. In other examples, the user interface can be a touch screen display. In yet another example, the user interface can provide only a display for controller 305. Controller 305 can be connected to and in communication with main discharge sensor 301, bifurcating passage sensor 305, main discharge multiplexer 304, and bifurcating multiplexer 306.

Controller 305 can include machine readable medium. The terms "machine readable medium" may include any medium that is capable of storing, encoding, or carrying instructions for execution by the device and that cause the device to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In operation of some examples, individual pumps (such as those shown in FIG. 2) can be used to pressurize and deliver sample stream and focusing stream to sample passage 322 and upstream passage 324, respectively for two-cycle separation, as discussed further below in FIGS. 4 and 5. During the separation cycle of the two-cycle separation, main discharge multiplexer 304 can connect main discharge 328 to high resistance source 308 and bifurcating passage multiplexer can connect bifurcating passage 330 to low resistance source 316 to create a middle (or mid) resistance at bifurcating passage 330. In this conditions, as described in FIGS. 3 and 4 below, bifurcating passage 330 can receive deformable particles from the sample stream, which can be acinar in some examples, while main discharge 328 can receive a large portion of the combined flow. The deformable particles can pass through bifurcating passage 330, multiplexer 306, low resistance source 316, and be deposited into acinar waste reservoir 320. The combined flow can pass through main discharge 328, main discharge multiplexer 304, high resistance source 308, and can be deposited into waste reservoir 310.

When a non-deformable particle (such as an islet) clogs or partially clogs bifurcating passage 330, a fluid property of the portion of flow discharged by bifurcating passage 330 will be altered. For example, a flow rate through bifurcating passage 330 can lower and a pressure within bifurcating passage (and upstream of bifurcating multiplexer 306) can rise. In other examples, the fluid can change in other ways. Any change can be detected by bifurcating passage sensor 303. For example, bifurcating passage can detect a pressure drop in the flow from bifurcating passage 330. Bifurcating passage 330 can then alter its signal sent to controller 305. Controller 305 can determine, based on a reduced pressure signal (or other changed condition) that a non-deformable particle is partially clogging bifurcating passage 330. Controller 305 can then send a signal to main discharge multiplexer 304 to switch to low resistance source 312 and a signal to bifurcating multiplexer 306 to switch to high resistance source 318. This change in resistance can cause the non-deformable particle or particles (such as islets) clogging bifurcating passage 330 to enter main discharge 328, clearing the clog. The unclogged islets or non-deformable particles can enter main discharge 328, pass through main discharge multiplexer 304, pass through low resistance source 312 and into islet reservoir 314.

After the clog has been cleared, a change in conditions can be detected by one or both of main discharge sensor 301 and bifurcating passage sensor 303. Controller 305 can use these signals to determine that bifurcating passage 330 is clear and can then send a signal to main discharge multiplexer 304 to connect again to high resistance source 308 and a signal to bifurcating passage multiplexer 306 to connect again to low resistance 316. In some examples, controller 305 can wait an increment of time before sending the signals to switch the multiplexers.

This process can be repeated many times to continuously separate deformable acinar particles from non-deformable islet particles. By repeating multiple cycles of two-cycle separation islets can be separated from acinar tissue, providing a high concentration of islet cells. By collecting higher concentration of islet cells, the number of donor samples required can be reduced. Further, by removing acinar tissue, rejection rates of transplant recipients can be lowered.

Figure 4:
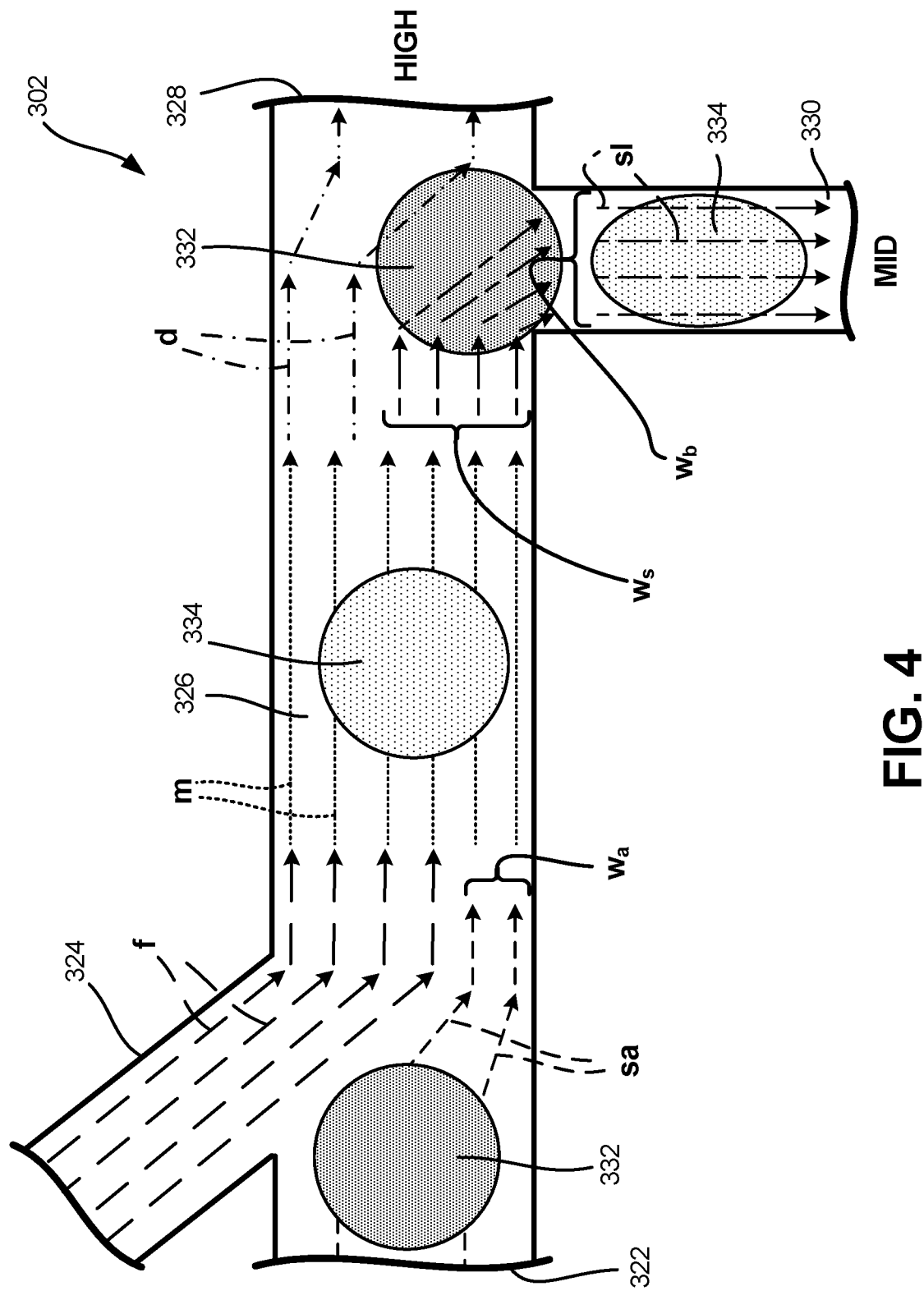
FIG. 4 illustrates a schematic view of a microfluidic device, in accordance with at least one example of the present disclosure.

FIG. 4 illustrates a schematic view of microfluidic device 302, in accordance with at least one example of the present disclosure. Microfluidic device 302 can include sample passage 322, upstream passage 324, combining passage 326, main discharge 328, and bifurcating passage 330. Also shown in FIG. 4 are islets 332, acinar 334, sample stream sa, focusing stream f, combined stream m, discharge stream d, selected stream sl, pinch width $w_a$, selection width $w_s$, and bifurcating passage width $w_b$.

Microfluidic device 302 of FIG. 4 can be consistent with the description of FIG. 3; however, FIG. 4 shows additional details of the operation of microfluidic device 302. FIG. 4 also shows that upstream passage is offset from orthogonal relative to main passage 322. In some examples, the angle of upstream passage relative to main passage can be between 5 degrees and 85 degrees. In other examples, the angle can be between 30 degrees and 60 degrees. FIG. 4 also shows bifurcating width $w_b$, which can be smaller than a width of main discharge 330.

In operation of some examples, sample stream sa can be provided by sample passage 322 and can include acinar particles 334 and islets 332. As discussed above, acinar particles 334 can be significantly more deformable than islet particles. Focusing stream f (which can be a non-volatile solution) can be injected into microfluidic device by upstream passage 324 at an angle relative to sample passage 322 and therefore sample stream sa. Focusing stream f can interact with sample stream sa, creating pinch width $w_a$, which can be a width at which sample stream sa is forced to pass through. Because microfluidic device 302 is of micro dimensions (for example, combining width can be 1000 micrometers, in some examples), the Reynolds numbers of focusing flow f and sample stream sa can be laminar, preventing sample stream sa and focusing flow f from creating an eddy current or turbulent flow within combining passage 326.

As sample stream sa and focusing flow f interact, they can create combined stream m within combining passage 326, while acinar 334 and islets 332 are forced towards bifurcating passage 330. As shown in FIG. 3, main discharge 328 can be connected to a high resistance source creating a high flow resistance (HIGH of FIG. 4) at main discharge 328 and bifurcating passage 330 can be connected to a low resistance source creating a mid-resistance (MID of FIG. 4) at bifurcating passage 330. The ratio of the resistance of the main discharge to the resistance of the bifurcating passage can dictate selection width $w_s$, where selection width $w_s$ can dictate a flow path taken by particles of combined stream m. For example, when the ratio of resistances creates a selection width $w_s$ significantly large, bifurcating path 330 can receive acinar 334. In this condition bifurcating path 330 can also receive islets 332. However, because islets 332 do not deform they cannot travel through bifurcating passage 330, which can have a width of approximately 80% of a width of acinar 334 and islets 332. Because acinar 334 can deform, acinar 334 can travel into bifurcating passage 330. Because islets do not deform, they can be held by at an opening of bifurcating passage 330 caused by pressure differential. The second portion of the two-cycle separation is discussed in FIG. 5 below.

Figure 5:
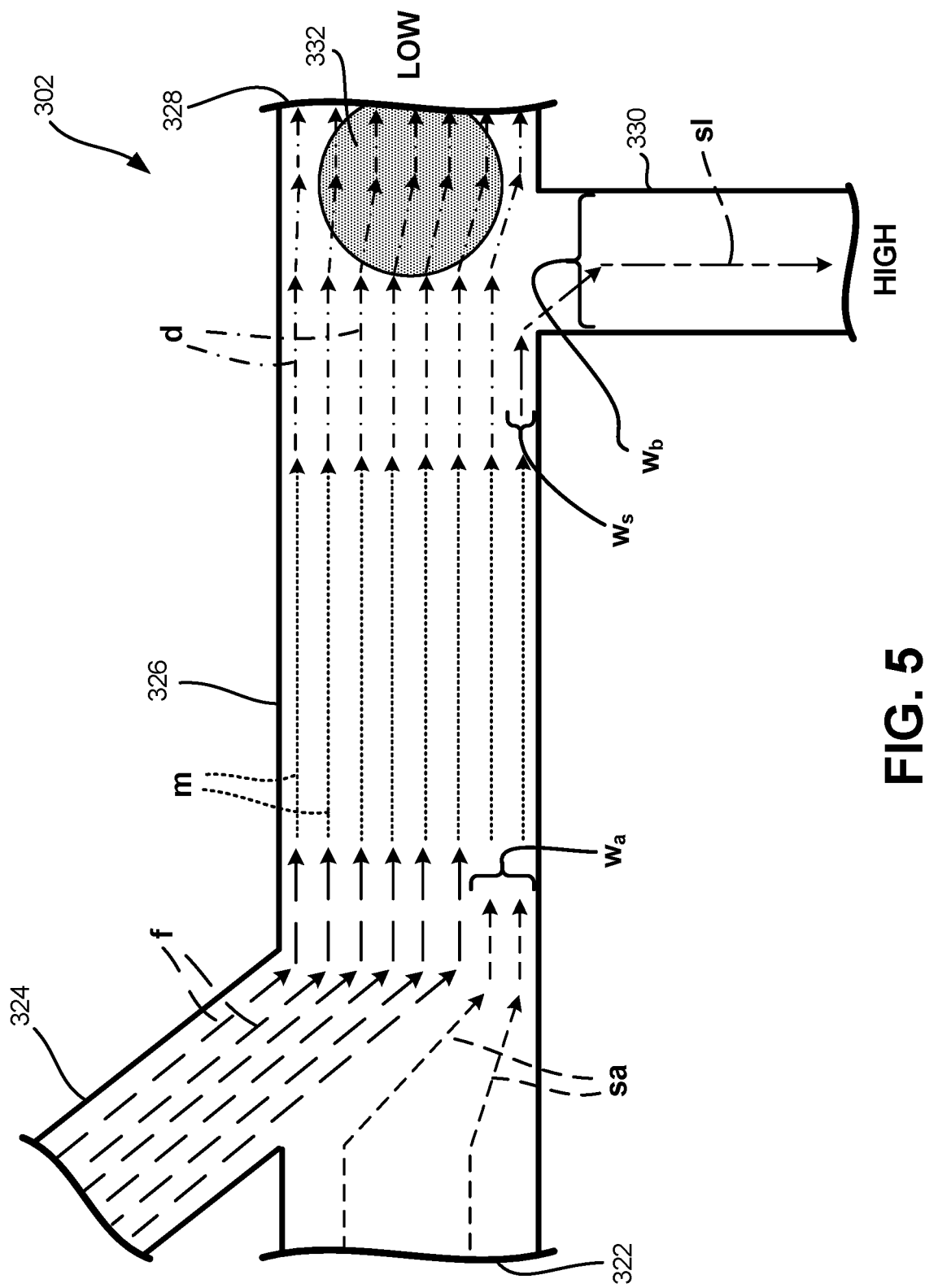
FIG. 5 illustrates a schematic view of a microfluidic device, in accordance with at least one example of the present disclosure.

FIG. 5 illustrates a schematic view of microfluidic device 302, in accordance with at least one example of the present disclosure. Microfluidic device 302 can include sample passage 322, upstream passage 324, combining passage 326, main discharge 328, and bifurcating passage 330. Also shown in FIG. 4 are islets 332, sample stream sa, focusing stream f, combined stream m, discharge stream d, selected stream sl, pinch width $w_a$, selection width $w_s$, and bifurcating passage width $w_b$.

Microfluidic device 302 of FIG. 5 can be consistent with the description of FIG. 4, except that FIG. 5 shows the sample collection phase of the two-cycle separation process, where main discharge 328 is connected to a low pressure source to create a low flow resistance at main discharge 328 (shown as LOW in FIG. 5) and bifurcating passage 330 is connected to a high resistance source to create a high flow resistance in bifurcating passage 330 (shown as HIGH in FIG. 5). As a result, the selection width $w_s$ can be significantly smaller than in FIG. 4, causing a reduced selected stream sl. This arrangement can also cause islets trapped at an opening of bifurcating passage 330 (as shown in FIG. 4) to release and exit microfluidic device 302 through main discharge 328 so that islet cells can be collected, as illustrated in FIG. 5 by islet 332 entering main discharge 328.

As discussed above, the two-cycle separation process shown in FIGS. 4 and 5 can be repeated in small increments of time to collect a high quantity of islet cells without causing damage to the islets. Though islets are not deformable, islets have a relatively low Young's modulus intercellular matrix. This means islets subjected to high forces while clogging the opening of bifurcating passage 328 can cause islets to break apart, making pressure and timing critical to avoid separation. In some examples, the cycle can switch quickly, such as every one second, in some examples, to avoid separation of islet cells. Further the shape of bifurcating passage 328 can have an oval or other shape cross section that avoids complete clogging of bifurcating passage 328 by islets 332. This can help to reduce pressure and therefore forces applied to islets 332, lowering the likelihood of damage caused to the islets by forces applied by the opening of bifurcating passage 328 onto the islets.

Figure 6:
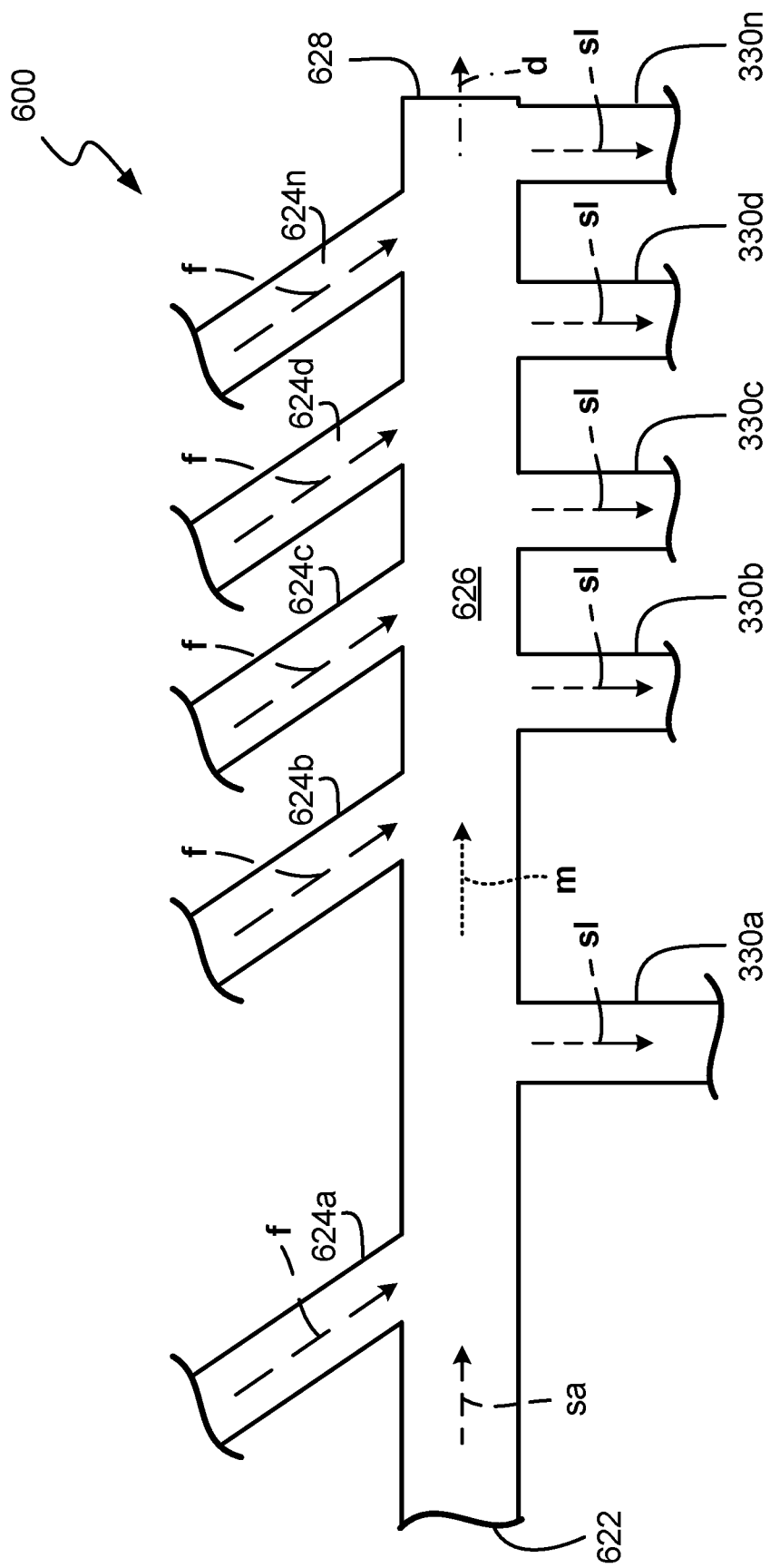
FIG. 6 illustrates a schematic view of a microfluidic device, in accordance with at least one example of the present disclosure.

FIG. 6 illustrates a schematic view of microfluidic device 600, in accordance with at least one example of the present disclosure. Microfluidic device 600 can include sample passage 622, upstream passages 624a-624n, combining passage 626, main discharge 628, and bifurcating passages 630a-630n. Also shown in FIG. 4 are sample stream sa, focusing stream f, combined stream m, discharge stream d, selected stream sl, pinch width $w_a$, selection width $w_s$, and bifurcating passage width $w_b$.

Microfluidic device 600 can be similar to microfluidic device 302 described above, except that microfluidic device 600 can include a plurality of upstream passages 624a-624n and a plurality of bifurcating passages 630a-630n. Each of upstream passages 624a-624n can be offset from an orthogonal angle from sample passage 622. As discussed with respected to microfluidic device 302 above, each of upstream passages 624a-624n can have an angle with respect to sample passage 622 between 20 degrees and 70 degrees, in some examples. Each of upstream passages 624a-624n can be immediately upstream of one of bifurcating passages 630a-630n. For example, upstream passage 624a can be upstream of bifurcating passage 630a, but upstream passage 624b can be downstream of bifurcating passage 630a, as shown in FIG. 7.

Each of upstream passages 624a-624n can be configured to deliver focusing stream f to align sample stream sa with selection width $w_s$, similar to microfluidic device 302. However, in microfluidic device 602, each of upstream passages 624a-624n realigns sample stream sa and/or combined stream m prior to each of bifurcating passages 630a-630n. Accordingly, each of upstream passages 624a-624n provide focusing stream f at a flow rate required to perform alignment of sample stream sa and to make up for a flowrate of selected stream sl discharged through each of bifurcating passages 630a-630n. Each of bifurcating passages 630a-630n can be configured and sized to receive deformable acinar while not accepting viable islets of a similar size to the acinar, as described with respect to FIGS. 3-5 above.

In operation of some examples, microfluidic device 600 can be cycled in a two-cycle separation process as described above with respect to FIGS. 3-5. Except that, because microfluidic device 600 contains many bifurcation passages, several or many acinar and islets can be collected during each two-cycle separation cycle, increasing collection speed and efficiency.

Figure 7:
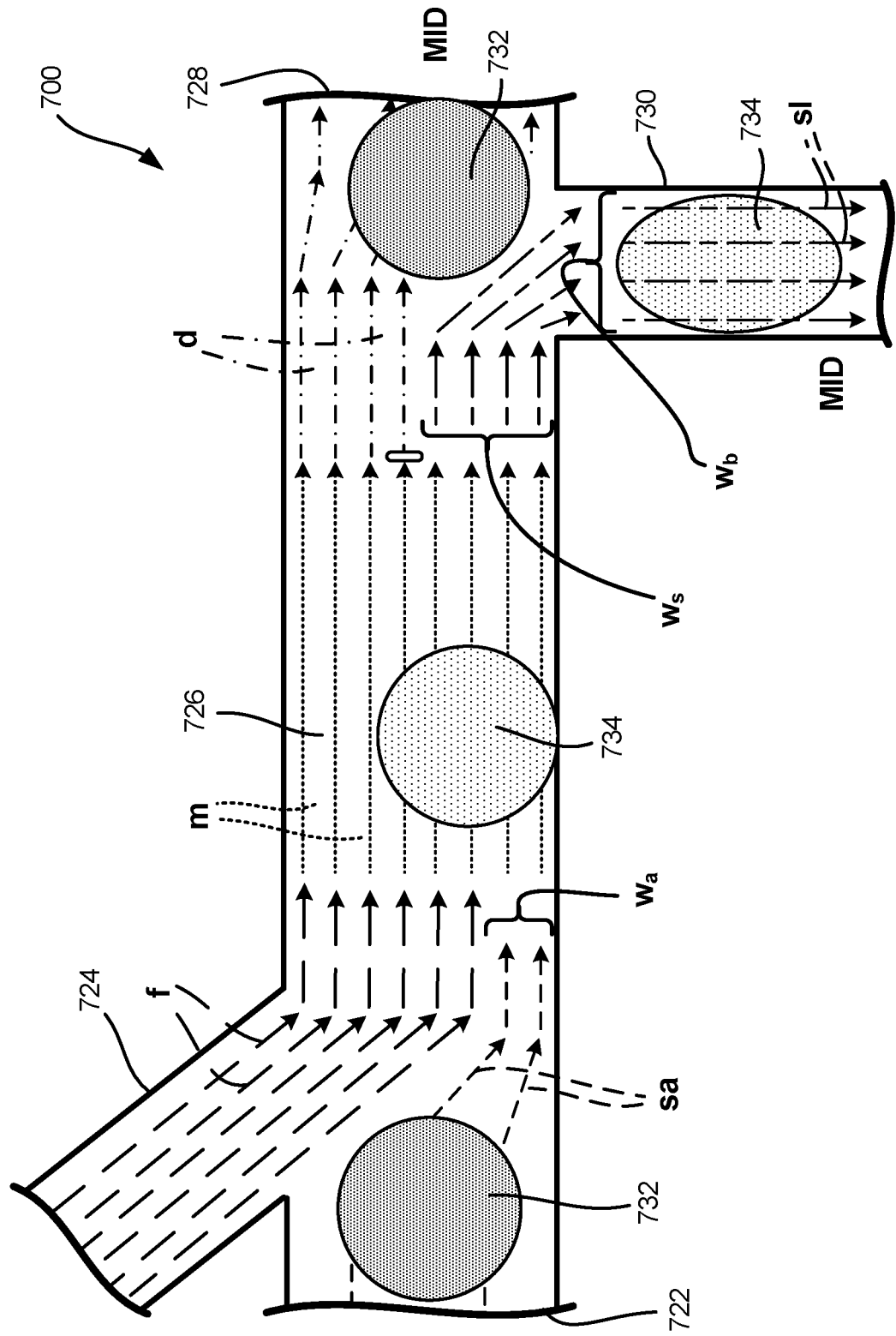
FIG. 7 illustrates a schematic view of a microfluidic device, in accordance with at least one example of the present disclosure.

FIG. 7 illustrates a schematic view of microfluidic device 700, in accordance with at least one example of the present disclosure. Microfluidic device 700 can include sample passage 722, upstream passage 724, combining passage 726, main discharge 728, and bifurcating passage 730. Also shown in FIG. 7 are islets 732, acinar 734, sample stream sa, focusing stream f, combined stream m, discharge stream d, selected stream sl, pinch width $w_a$, selection width $w_s$, and bifurcating passage width $w_b$.

Microfluidic device 700 can be consistent with the description of microfluidic device 302 of FIGS. 3-5 above. However, FIG. 7 illustrates an application of a middle pressure source the each of main discharge 728 and bifurcating passage 730 to create a mid flow resistance at each of main discharge 728 and bifurcating passage 728 (shown in FIG. 7 as MID and MID).

In this configuration, deformable cells, such as acinar 734 can be selected through bifurcating passage 730. But, because the resistance in main discharge 728 is about the same as bifurcating passage 730, islets 732 can be discharged through main discharge 728, as shown in FIG. 7. This process can accomplish separation and collection of acinar and islets without a two-cycle process, which can save time and energy.

Figure 8:
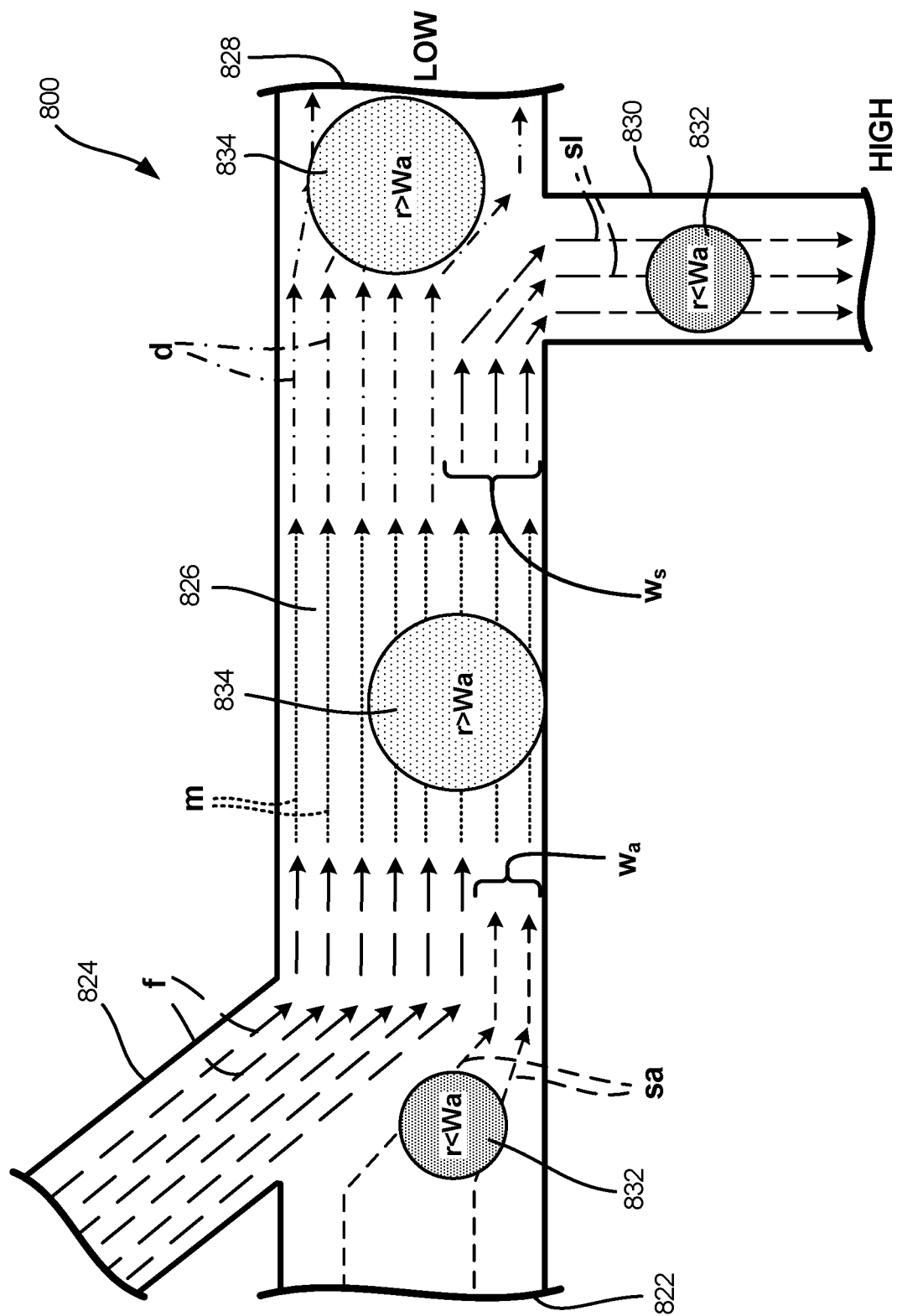
FIG. 8 illustrates a schematic view of a microfluidic device, in accordance with at least one example of the present disclosure.
Figure 9:
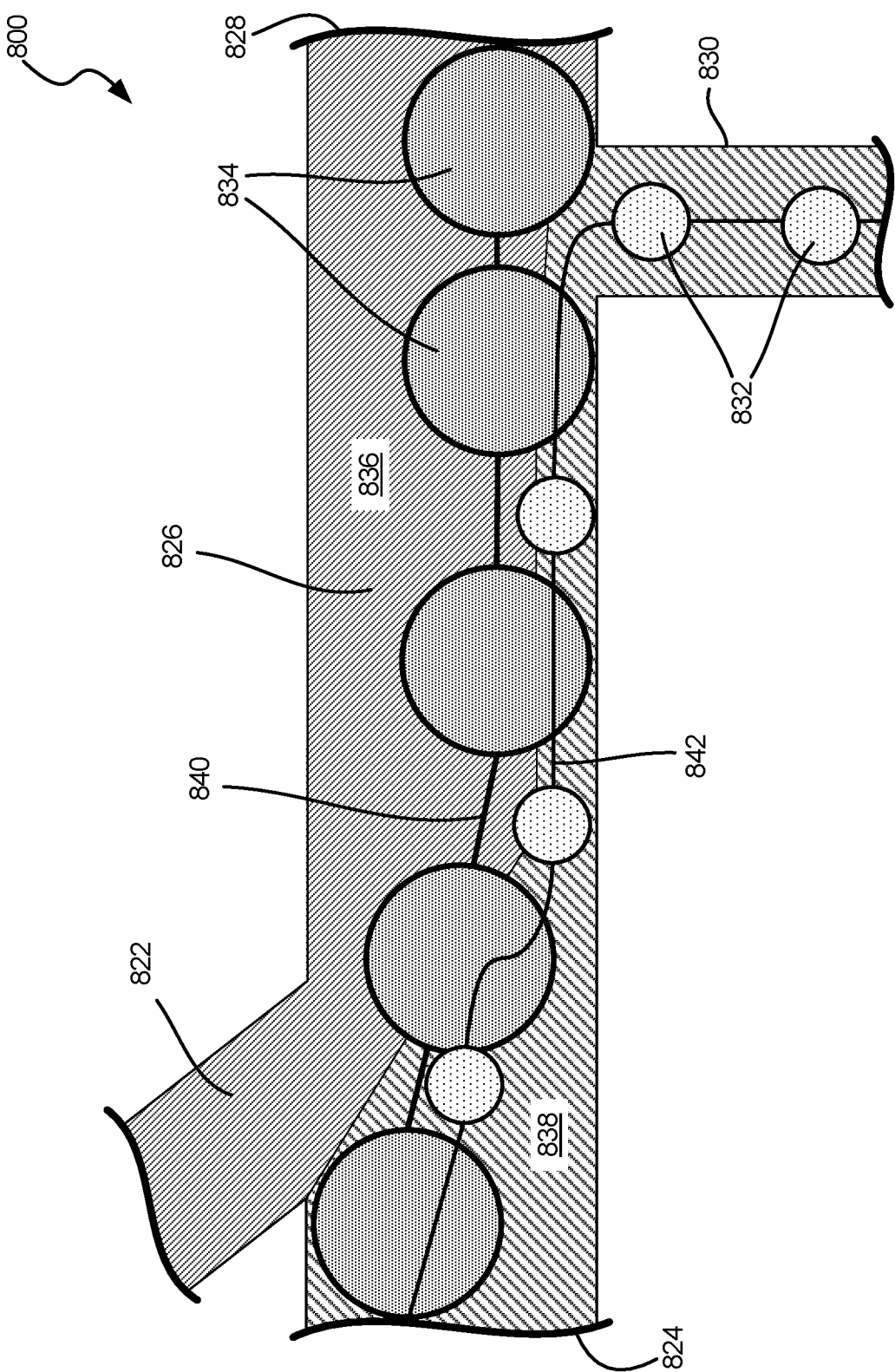
FIG. 9 illustrates a view of a microfluidic device, in accordance with at least one example of the present disclosure.

FIG. 8 illustrates a schematic view of microfluidic device 800, in accordance with at least one example of the present disclosure. FIG. 9 illustrates a schematic view of microfluidic device 800, in accordance with at least one example of the present disclosure. FIGS. 8 and 9 are discussed below concurrently.

Microfluidic device 800 can include sample passage 822, upstream passage 824, combining passage 826, main discharge 828, and bifurcating passage 830. Also shown in FIG. 8 are small cells 832, and large cells 834, sample stream sa (838 in FIG. 9), focusing stream f (836 in FIG. 9), combined stream m, discharge stream d, selected stream sl, large particle center of gravity 840 (only shown in FIG. 9), small particle center of gravity 842 (only shown in FIG. 9), pinch width $w_a$, selection width $w_s$, and bifurcating passage width $w_b$.

In FIG. 8, a high flow rate focusing stream f can pinch sample stream sa to a width $w_a$. Sample stream sa can include small ($r<W_a$) 832 and large ($r>W_a$) 834 cell aggregates. Because, large cell center of gravity 840 is further away from the channel sidewall than those of smaller aggregates 832, small cell center of gravity 842 can be within selection width $w_s$ and large particle center of gravity 840 can be outside of selection width $w_s$. Resistance of bifurcating passage 830 can be high due to its smaller size (shown in FIG. 8 as HIGH) to that of main discharge 828 due to its larger size (shown in FIG. 8 as LOW), which can determine the width ($w_s$) over which bifurcating passage 830 can select aggregates. Though FIGS. 8 and 9 show a particle size difference, a size difference is not necessary for hydrodynamic filtration. Differences in center of gravity can be sufficient to achieve separation when flow rates/resistances are correctly selected.

In some examples, adjustment of the resistances can enable a small enough $w_s$ for selecting smaller particles, such as small cells 832. This process can be referred to as hydrodynamic separation, where a relatively large difference in the flow rates of focusing stream f and sample stream sa can ensure a small enough $w_a$ for driving all cell aggregates towards the channel sidewall near bifurcating passage 330. This coupled with low resistance at main discharge 828 and high resistance at bifurcating passage 830 can enable appropriate $w_s$ for selection of cells based on size. This process can be used to separate cells of different sizes, such as acinar, islets, and small, medium, and large islets.

Further, because microfluidic devices 302, 700, and 800 can be the same microfluidic device, a hydrodynamic mode for separation based on size differences (such as shown in FIG. 8) can be performed on the same microfluidic device as two-cycle selection (such as shown in FIGS. 4 and 5) and cross-flow separation (such as shown in FIG. 7), by simply modulating input flow rates and outlet flow resistances by using multiplexing flow switches (such as main discharge multiplexer 304 and bifurcating passage multiplexer 306 of FIG. 3), without any alteration to channel dimensions or design of the microfluidic device.

FIGS. 10A-10E illustrate operations of microfluidic device 1000, in accordance with at least one example of the present disclosure. Microfluidic device can include sample passage 1022, upstream passages 1024a-1024n, bifurcating passages 1030a-1030n, and discharge passage 1028. Also shown in FIGS. 10A-10E are acinar and islets.

FIGS. 10A-10E show a time lapse of acinar and islets interacting with microfluidic device 1000. As shown in FIG. 10A, acinar can enter bifurcating passage 1030a and islets can engage 1030n during a separation cycle of two-cycle separation. The deformable structure of the acinar tissue causes it transferred into bifurcating passage 1030A (as shown in FIG. 10B0 of smaller size due to the lower flow resistance of bifurcating passage 1030a. Islets, on the other hand, can become trapped by bifurcating passages due to non-deformability, as shown in FIGS. 10B and 10C. Acinar can continue through bifurcating passage 1030a, as shown in FIG. 10B. As shown in FIG. 10C, additional acinar can engage bifurcating passage 1030a, as sample passage continues to provide a sample stream during the separation cycle.

Then, the resistances can be altered (as described in FIGS. 3-5 above) so that the resistance of main discharge 1028 is lower than the resistance of bifurcating passages 1030a-1030n, causing the trapped islet to release from bifurcating passage 1030n (as shown in FIG. 10D) where the islet can continue through main discharge 1028 and be collected downstream, leaving microfluidic device 1000 clear (as shown in FIG. 10E). This cycle can be repeated to separate and collect acinar and islets.

Figure 11A:
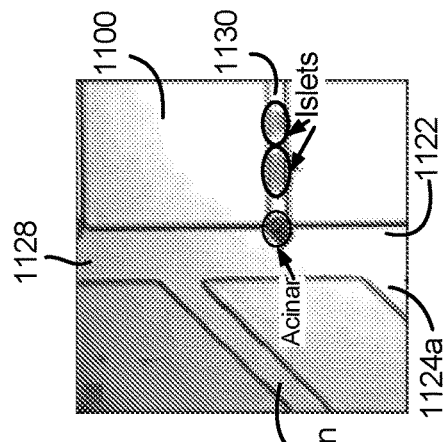
FIGS. 11A-11E illustrate operations of a microfluidic device, in accordance with at least one example of the present disclosure.
Figure 11B:
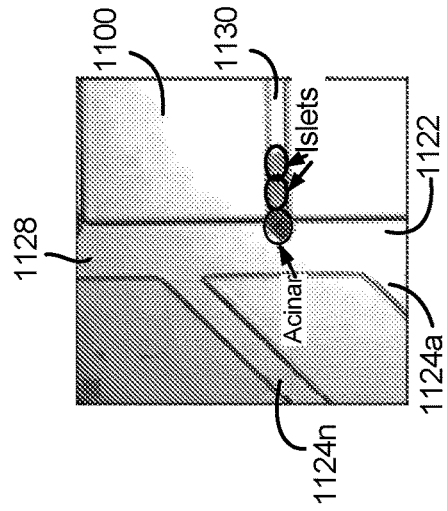

FIGS. 11A-11B illustrate operations of microfluidic device 1100, in accordance with at least one example of the present disclosure. Microfluidic device 1100 can include sample passage 1122, upstream passages 1124a-1124n, bifurcating passages 1130a-1130n, and discharge passage 1128. Also shown in FIGS. 11A-11E are acinar and islets.

Figure 11C:
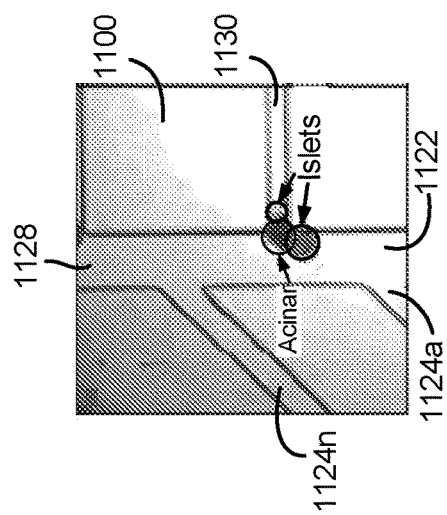
Figure 11D:
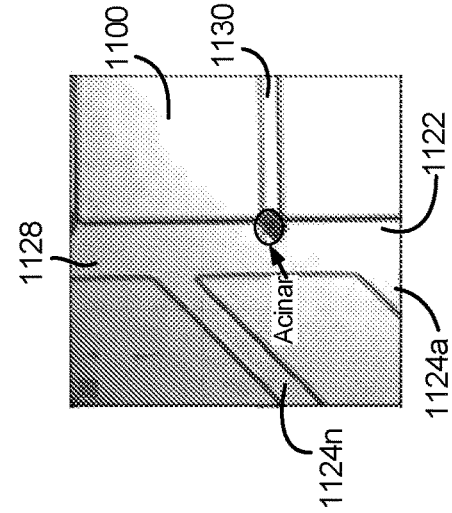
Figure 11E:
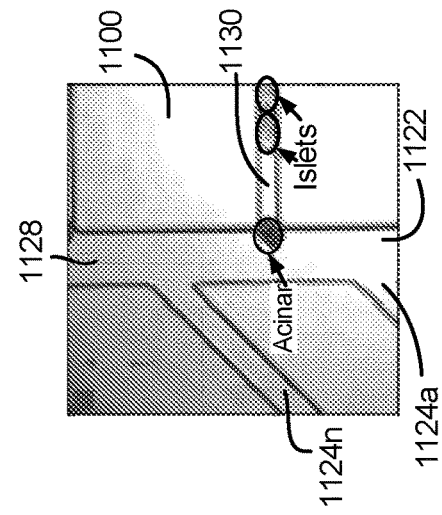

Collected samples from density gradient methods, such as shown in FIG. 1, can include non-viable islets, which can exacerbate immune rejection issues if included in transplanted material. Because gradual loss of viability of islets causes the islets to become more deformable, low viability islets can be separated from high viability islets using the microfluidic devices discussed above. FIG. 11A shows islet samples together with acinar tissue. As shown in FIG. 11B islet samples start to exhibit the systematic ability to deform after approximately 75 hours of harvesting, as FIGS. 11B-11D shows islets deforming into and passing through bifurcating passage 1130 until only acinar remains as shown in FIG. 11E. This can be achieved using either two-cycle separation described with respect to FIGS. 3-5 or under the microfluidic crossflow mode described with respect to FIG. 7.

FIGS. 12A-12F illustrate operations of microfluidic device 1200, in accordance with at least one example of the present disclosure. Microfluidic device 1200 can include sample passage 1222, upstream passages 1224a-1224n, bifurcating passages 1230a-1230n, and discharge passage 1228. Also shown in FIGS. 12A-12E are small high density islets 1232 and large islets 1234.

The collected sample from the density gradient based separation method, such as the method of FIG. 1, can provide a high degree of variability in islet size. Islets of smaller size are known to be better suited for transplantation versus large islet, making smaller and denser islets more desirable. Separation of small and large islets can be achieved by using the differences in flow streamlines for aggregates of differing size under microfluidic hydrodynamic flow, as explained in FIGS. 8 and 9. As shown in FIGS. 12A-12C, small islets can be transported down bifurcating passages 1230a-1230n, while larger particles can be discharged through main discharge, as shown in FIGS. 12D-12F.

Figure 13:
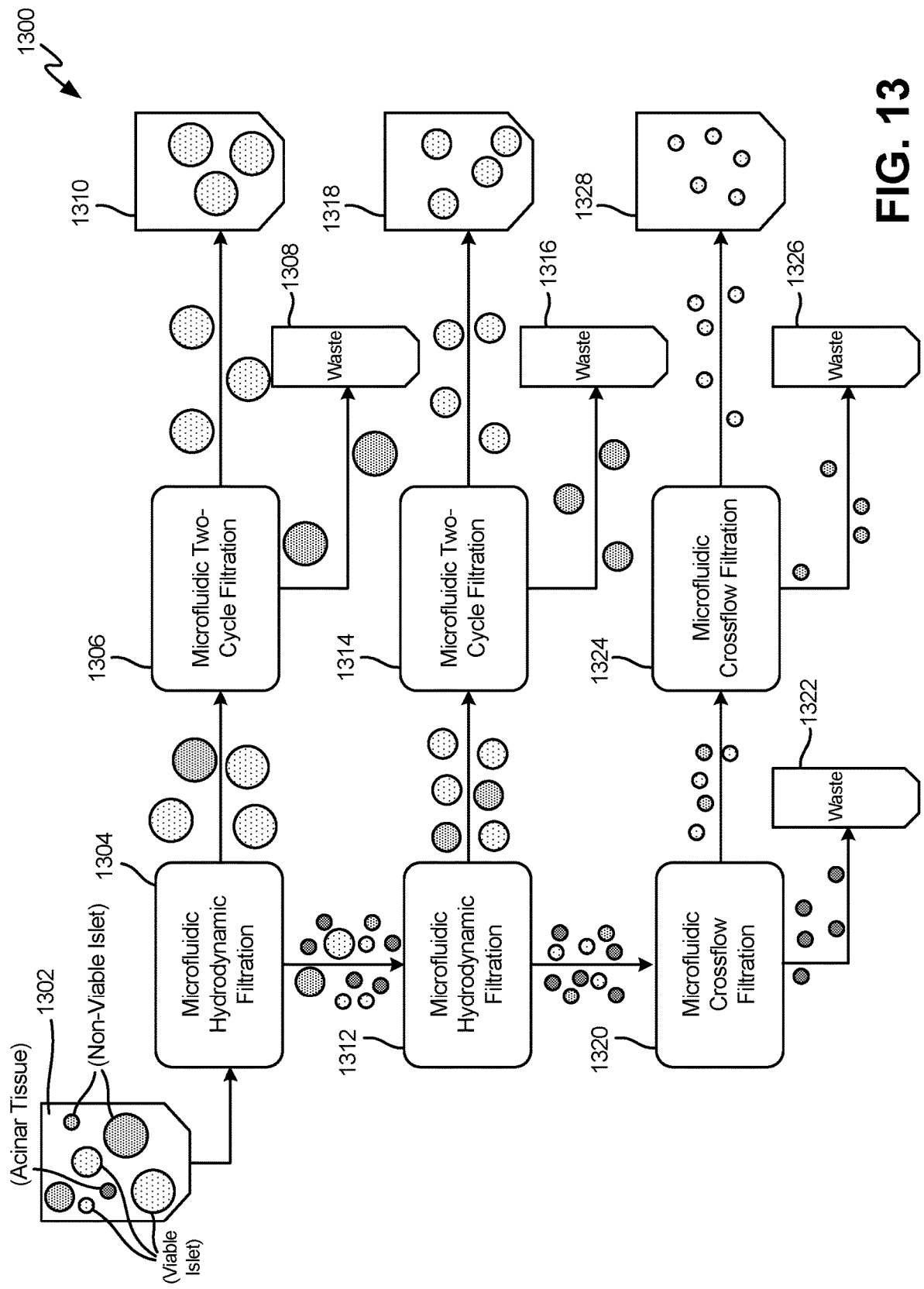
FIG. 13 illustrates a schematic view of a microfluidic system, in accordance with at least one example of the present disclosure.

FIG. 13 illustrates a schematic view of microfluidic system 1300, in accordance with at least one example of the present disclosure. System 1300 can include sample reservoir 1302, which can include viable islets, non-viable islets, and acinar tissue (also shown throughout system 1300). System 1300 can also include first sorting stage 1304, second sorting stage 1306, large waste reservoir 1308, large collection reservoir 1310, third sorting stage 1312, fourth sorting stage 1314, medium waste reservoir 1316, medium collection reservoir 1318, fifth sorting stage 1320, small acinar waste reservoir 1322, sixth sorting stage 1324, small waste reservoir 1326, and small collection reservoir 1328.

In one example, first sorting stage 1307 can be configured to perform hydrodynamic filtration (such as shown with respect to FIGS. 8 and 9 above) to separate large particles from medium particles and small particles, where first sorting stage 1304 can include a first stage first discharge and a first stage second discharge. Second sorting stage 1306 can be connected to the first stage first discharge. Second sorting stage 1306 can be configured to perform two-cycle separation (such as is described in FIGS. 3-5, for example) to separate deformable large particles from non-deformable large particles. Waste reservoir 1908 can collect non-viable islets and collection reservoir 1310 can collect viable islets.

Third sorting stage 1312 can be connected to first stage second discharge. Third sorting stage 1312 can be configured to perform hydrodynamic filtration to separate medium particles from small particles. Third sorting stage 1312 can include a third stage first discharge and a third stage second discharge. Fourth sorting stage 1314 can be connected to the third stage first discharge. Fourth sorting stage 1314 can be configured to perform two-cycle separation to separate deformable medium particles from non-deformable medium particles. The deformable, non-viable islets can be collected in waste reservoir 1316 and the viable islets can be collected in collection reservoir 1318.

Fifth sorting stage 1320 can be connected to the third stage second discharge. Fifth sorting stage 1320 can be configured to perform crossflow filtration (such as is shown in FIG. 7 above) to separate deformable small particles from non-deformable small particles. Fifth sorting stage 1320 can include a fifth stage discharge and can deliver acinar waste to acinar waste reservoir 1322. Sixth sorting stage 1324 can be connected to the fifth stage second discharge. Sixth sorting stage 1324 can be configured to perform two-cycle filtration to separate first non-deformable small particles from second non-deformable small particles. Though first through sixth stages are shown and discussed as performing specific processes, each stage can be configured to perform other processes to achieve different separation profiles. Similarly, though system 1300 is shown as having six separate systems or processes, less, or more individual systems or processes can be used to achieve the same separation results, as the microfluidic devices used to perform the processes, as discussed above, can be used interchangeably, or to perform any of the three processes discussed herein.

Using these systems, system 1300 can separate small, medium, and large viable islets from small, medium, and large non-viable islets, and can separate acinar. Small, medium, and large viable islets can then be collected and used for transplant. By removing non-viable islets and acinar, transplant rejection can be reduced.

Figure 14B:
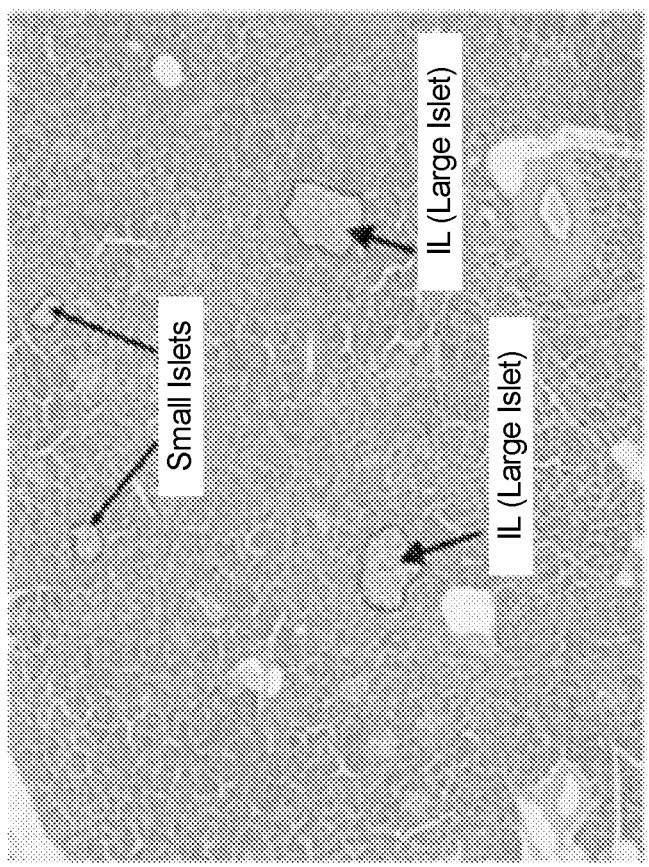
FIG. 14B illustrates an image of islet particle distribution, in accordance with at least one example of the present disclosure.
Figure 14A:
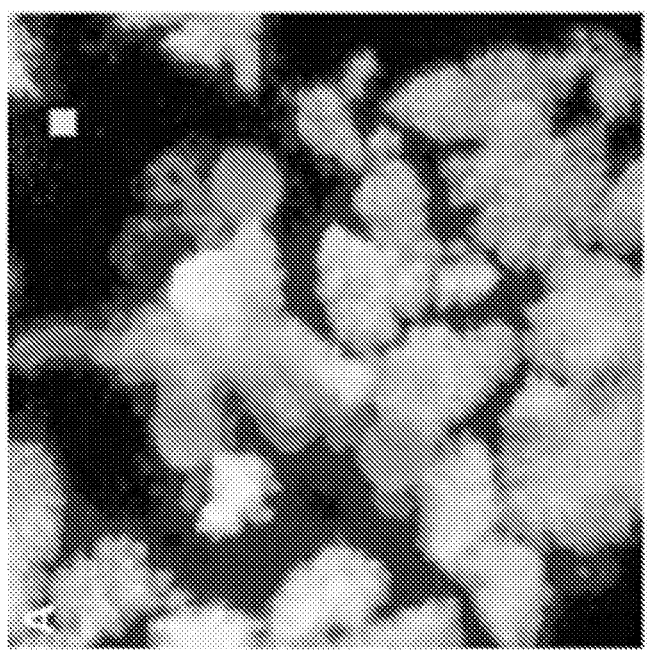
FIG. 14A illustrates an image of islet particles, in accordance with at least one example of the present disclosure.

FIG. 14A illustrates an image of islet particles, in accordance with at least one example of the present disclosure. FIG. 14B illustrates an image of islet particle distribution, in accordance with at least one example of the present disclosure. FIGS. 14A and 14B are discussed concurrently.

A number of studies have established that while the number of islets per pancreas varies in proportion to the body weight of the mammal, an optimal size distribution may be needed to support intercellular coupling for stable synchronization of insulin secretion, because effectively coupled β-cells can produce the necessary bursting action potentials, whereas single cells can only generate spiking action potentials. Some islets can be arranged in architectures of cell aggregates ranging from 10-1000 cells, with saturation of insulin secretion beyond the critical size of about 100 cells, as apparent from some images after histology as shown in FIGS. 14A and 14B. Therefore, the architecture of cell aggregates within the transplant should optimally mimic these natural size distributions of islets within a healthy set of pancreas.

Figure 15:
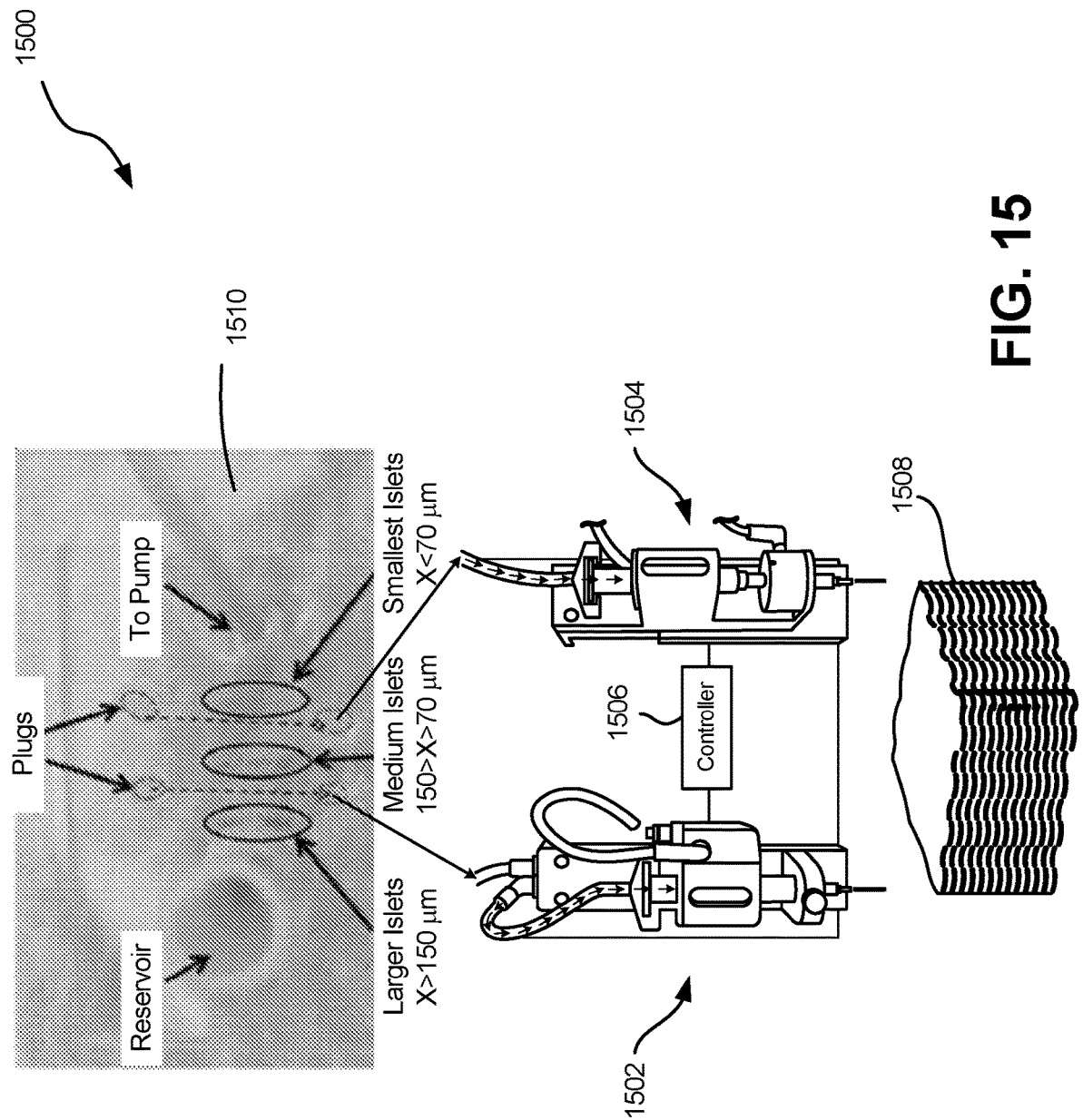
FIG. 15 illustrates an image of a bio-printing system, in accordance with at least one example of the present disclosure.

FIG. 15 illustrates an image of bio-printing system 1500, in accordance with at least one example of the present disclosure. Bio-printing system 1500 can include first dispenser 1502, second dispenser 1504, controller 1506, printed material 1508, and sorting system 1510.

Sorting system 1510 can be any of the sorting systems described with respect to the FIGS. above, such as system 1300 of FIG. 13. Sorting system 1510 can be connected to first dispenser 1502 and second dispenser 1504, where first dispenser 1502 can receive, for example, large islets from sorting system 1510 and second dispenser 1504 can receive, for example small islets from sorting system 1510. In some examples, a third dispenser configured to receive medium sized islets from sorting system 1510 can be included in bio-printing system 1502.

In some examples, first dispenser 1502 can be configured to dispense the small viable islets and second dispenser 1504 can be configured to dispense large viable islets. Controller 1506 can be in communication with first dispenser 1502 and second dispenser 1504 to selectively operate first dispenser 1502 and second dispenser 1504 to print the small viable islets and the large viable islets onto an implantable substrate.

In some examples, bio-printing system 1502 can include additional dispensers configured to dispense additional material configured to aid in transplant and acceptance thereof by the recipient. In some examples, implant 1508 can receive stem cell aggregates that can improve vascularization of implant. In some other examples, implant 1508 can receive angeogenic growth factors to activate receptors on endothelial cells. These methods can improve acceptance of the implant and can lower rejection.

Bio-printing system 1500 can also provide a system for printing spatially patterned cell aggregates, or a size distribution of islets that can be required to attain normal functionality. In some examples, bio-printing system 1500 can modify the printed implant based on anatomy (such as body mass) of patient, which can further improve implant acceptance and can help prevent rejection.

VARIOUS NOTES & EXAMPLES

To further illustrate the apparatuses and systems disclosed herein, the following non-limiting examples are provided:

Example 1 is a microfluidic device comprising: an upstream passage configured to provide a focusing stream; a sample passage configured to provide a sample stream; a bifurcating passage including a specified bifurcating flow resistance; a combining passage configured to create a combined stream from the focusing stream and the sample stream, the focusing stream directing the sample stream away from the upstream passage and toward the bifurcating passage; wherein a first portion of the combined stream is discharged through the bifurcating passage; and a main discharge configured to discharge a second portion of the combined stream, the main discharge including a main discharge resistance that is selectable to vary the main discharge resistance relative to the bifurcating flow resistance.

In Example 2, the subject matter of Example 1 optionally includes the main discharge further comprising: a main discharge multiplexer configured to selectively vary the main discharge resistance.

In Example 3, the subject matter of Example 2 optionally includes the bifurcating passage further comprising: a bifurcating passage multiplexer configured to selectively vary the bifurcating passage resistance.

In Example 4, the subject matter of any one or more of Examples 1-3 optionally include wherein: the upstream passage is configured to deliver the focusing stream to selectably determine a particle size accepted by the bifurcating passage.

In Example 5, the subject matter of any one or more of Examples 1~4 optionally include wherein: the upstream passage and the sample passage are configured to create a pinch width in the combining chamber to direct the sample stream towards the bifurcating passage.

In Example 6, the subject matter of Example 5 optionally includes wherein the upstream passage is configured to deliver the focusing stream at a laminar flow rate and the sample passage is configured to deliver the stream flow at a laminar flow rate.

Example 7 is a microfluidic system comprising: a sample passage configured to deliver a sample stream; a plurality of upstream passages each configured to provide one of a plurality of focusing streams; a plurality of bifurcating passages, each of the plurality of bifurcating passages disposed downstream of one of the plurality of upstream passages and configured to discharge a portion of the sample stream; and a plurality of combining passages, each of the plurality of combining passages configured to create a combined stream from one of the plurality of focusing streams and the sample stream, each of the plurality of focusing streams directing the sample stream away from the plurality of upstream passages and toward one of the bifurcating passages disposed downstream of the one of the upstream passages a main discharge configured to discharge a second portion of the combined stream.

In Example 8, the subject matter of Example 7 optionally includes the main discharge further comprising: a main discharge multiplexer configured to selectively vary a main discharge resistance.

In Example 9, the subject matter of Example 8 optionally includes a bifurcating passage multiplexer coupled to each of the bifurcating passages, the bifurcating passage multiplexer configured to selectively vary a bifurcating passage resistance of each of the bifurcating passages.

In Example 10, the subject matter of Example 9 optionally includes a main discharge sensor coupled to the main discharge and configured to produce a main discharge signal as a function of a sensed condition of the main discharge; a bifurcating passage manifold coupled to a discharge of each of the bifurcating passages; and a bifurcating passage sensor coupled to the bifurcating passage manifold and configured to produce a bifurcating passage signal as a function of a sensed condition of the bifurcating passage manifold.

In Example 11, the subject matter of Example 10 optionally includes a controller configured to operate the main discharge multiplexer and the bifurcating passage multiplexer as a function of one or more of the main discharge signal and the bifurcating passage signal.

In Example 12, the subject matter of any one or more of Examples 8-11 optionally include wherein: each of the plurality of upstream passages is configured to provide the focusing flow to create a selection width upstream of each of the plurality of bifurcating passages.

Example 13 is a microfluidic sorting system comprising: a microfluidic device comprising: an upstream passage; a sample passage; a bifurcating passage comprising a specified bifurcating flow resistance; a main discharge including a main discharge resistance that is selectable to vary the main discharge resistance relative to the bifurcating flow resistance.

In Example 14, the subject matter of Example 13 optionally includes a bifurcating passage multiplexer configured to selectively vary the bifurcating passage resistance.

In Example 15, the subject matter of Example 14 optionally includes a main discharge sensor coupled to the main discharge and configured to produce a main discharge signal as a function of a sensed condition of the main discharge.

In Example 16, the subject matter of Example 15 optionally includes a bifurcating passage manifold coupled to a discharge of each of the bifurcating passages; and a bifurcating passage sensor coupled to the bifurcating passage manifold and configured to produce a bifurcating passage signal as a function of a sensed condition of the bifurcating passage manifold.

In Example 17, the subject matter of Example 16 optionally includes wherein: the controller is configured to select the main discharge resistance and the bifurcating passage resistance as a function of at least one of the main discharge signal and the bifurcating passage signal.

In Example 18, the subject matter of any one or more of Examples 13-17 optionally include wherein the controller is configured to select main discharge resistance and the bifurcating passage resistance to: separate acinar from islets; separate large islets from small islets; and separate viable islets from non-viable islets.

In Example 19, the subject matter of any one or more of Examples 13-18 optionally include wherein the microfluidic device further comprises: a plurality of upstream passages each configured to provide one of a plurality of focusing streams; and a plurality of bifurcating passages, each of the plurality of bifurcating passages disposed downstream of one of the plurality of upstream passages and configured to discharge a portion of the sample stream.

In Example 20, the subject matter of any one or more of Examples 13-19 optionally include wherein the bifurcating passage comprises a restriction sized to be about 80 percent of a diameter of an acinar diameter.

Example 21 is a microfluidic sorting system comprising: a first sorting stage configured to perform hydrodynamic filtration to separate large particles from medium particles and small particles, the first sorting stage comprising a first stage first discharge and a first stage second discharge; and a second sorting stage connected to the first stage first discharge, the second sorting stage configured to perform two-cycle separation to separate deformable large particles from non-deformable large particles.

In Example 22, the subject matter of Example 21 optionally includes a third sorting stage connected to the first stage second discharge, the third sorting stage configured to perform hydrodynamic filtration to separate medium particles from small particles, the third sorting stage comprising a third stage first discharge and a third stage second discharge.

In Example 23, the subject matter of any one or more of Examples 21-22 optionally include a fourth sorting stage connected to the third stage first discharge, the fourth sorting stage configured to perform two-cycle separation to separate deformable medium particles from non-deformable medium particles; and a fifth sorting stage connected to the third stage second discharge, the fifth sorting stage configured to perform crossflow filtration to separate deformable small particles from non-deformable small particles; the fifth sorting stage comprising a fifth stage discharge; and a sixth sorting stage connected to the fifth stage discharge, the sixth sorting stage configured to perform two-cycle filtration to separate first non-deformable small particles from second non-deformable small particles.

Example 24 is a bio-printing system comprising: a microfluidic separating system configured to: separate acinar from islets; separate large islets from small islets; and separate viable islets from non-viable islets; a first dispenser configured to receive from small viable islets from the microfluidic separation system and configured to dispense the small viable islets; a second dispenser configured to receive large viable islets from the microfluidic separation system and configured to dispense large viable islets; and a controller configured to selectively operate the first dispenser and the second dispenser to print the small viable islets and the large viable islets onto an implantable substrate.

In Example 25, the subject matter of Example 24 optionally includes the microfluidic separating system further comprising: a sample passage configured to deliver a sample stream; a plurality of upstream passages each configured to provide one of a plurality of focusing streams; a plurality of bifurcating passages, each of the plurality of bifurcating passages disposed downstream of one of the plurality of upstream passages and configured to discharge a portion of the sample stream; and a plurality of combining passages, each of the plurality of combining passages configured to create a combined stream from one of the plurality of focusing streams and the sample stream, each of the plurality of focusing streams directing the sample stream away from the plurality of upstream passages and toward one of the bifurcating passages disposed downstream of the one of the upstream passages a main discharge configured to discharge a second portion of the combined stream.

In Example 26, the subject matter of any one or more of Examples 24-25 optionally include the microfluidic separating system further comprising: a main discharge multiplexer configured to selectively vary the main discharge resistance; a bifurcating passage multiplexer coupled to each of the bifurcating passages, the bifurcating passage multiplexer configured to selectively vary a bifurcating passage resistance of each of the bifurcating passages; a main discharge sensor in fluid coupled to the main discharge and configured to produce a main discharge signal as a function of a sensed condition of the main discharge; a bifurcating passage manifold coupled to a discharge of each of the bifurcating passages; and a bifurcating passage sensor coupled to the bifurcating passage manifold and configured to produce a bifurcating passage signal as a function of a sensed condition of the bifurcating passage manifold.

In Example 27, the subject matter of any one or more of Examples 24-26 optionally include a first sorting stage configured to perform hydrodynamic filtration to separate large particles from medium particles and small particles, the first sorting stage comprising a first stage first discharge and a first stage second discharge; and a second sorting stage connected to the first stage first discharge, the second sorting stage configured to perform two-cycle separation to separate large acinar particles from large islet particles.

In Example 28, the subject matter of Example 27 optionally includes a third sorting stage connected to the first stage second discharge, the third sorting stage configured to perform hydrodynamic filtration to separate medium particles from small particles, the third sorting stage comprising a third stage first discharge and a third stage second discharge; a fourth sorting stage connected to the third stage first discharge, the fourth sorting stage configured to perform two-cycle separation to separate medium acinar from medium islets; a fifth sorting stage connected to the third stage second discharge, the fifth sorting stage configured to perform crossflow filtration to separate small acinar from small islets; the fifth sorting stage comprising a fifth stage discharge; and a sixth sorting stage connected to the fifth stage discharge, the sixth sorting stage configured to perform two-cycle filtration to separate non-viable small islets from viable small islets.

In Example 29, the microfluidic device, system, assembly, or method of any one of or any combination of Examples 1-29 is optionally configured such that all elements or options recited are available to use or select from.

Each of these non-limiting examples can stand on its own, or can be combined in any permutation or combination with any one or more of the other examples.

The above detailed description includes references to the accompanying drawings, which form a part of the detailed description. The drawings show, by way of illustration, specific embodiments in which the present subject matter can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the present subject matter should be determined with reference to the appended claims, along with the full scope of equivalents to which such claims are entitled.

The invention claimed is:

1. A method of operating microfluidic device to separate acinar cells from islet cells, the method comprising:
providing a sample stream into a combining passage from an upstream sampling passage;
providing a focusing stream from an upstream focusing passage to the combining passage to, together with the sample stream, form a combined stream, the focusing stream directing the sample stream away from the upstream passage and toward a bifurcating passage that defines a bifurcating flow resistance and that defines a passage width and depth;
discharging a first portion of the combined stream through the bifurcating passage;
discharging a second portion of the combined stream out of a main discharge, the main discharge including a main discharge resistance;
varying the main discharge resistance using a main discharge multiplexer; and
establishing a threshold occlusion level to selectably accept particles in a specified deformability range for a specified size range in the bifurcating passage, the width or depth of the bifurcating passage, the main discharge resistance, and the bifurcating flow resistance together establishing the threshold occlusion level.

2. The method of claim 1, further comprising:
varying, selectively, the bifurcating flow resistance using a bifurcating passage multiplexer to adjust the threshold occlusion level.

3. The method of claim 1, further comprising:
delivering the focusing stream from the upstream passage to selectably determine a particle size accepted by the bifurcating passage.

4. The method of claim 1, further comprising:
directing the sample stream towards the bifurcating passage by creating a pinch width in the combining passage using the upstream passage and the sample passage.

5. The method of claim 4, wherein the upstream passage is configured to deliver the focusing stream at a laminar flow rate and the sample passage is configured to deliver the stream flow at a laminar flow rate.

6. The method of claim 1, further comprising:
separating acinar from islets, separating large islets from small islets, and separating viable islets from non-viable islets by varying the main discharge resistance.

7. The method of claim 1, wherein the bifurcating passage comprises a restriction sized to between 10 micrometers and 200 micrometers.

8. A method of operating microfluidic device to separate acinar cells from islet cells, the method comprising:
providing a sample stream into a combining passage from an upstream sampling passage including cellular aggregates including acinar cells and islet cells;
providing a focusing stream from an upstream focusing passage to the combining passage to, together with the sample stream, form a combined stream, the focusing stream directing the sample stream toward a bifurcating passage that defines a bifurcating flow resistance and that defines a passage width and depth;
discharging a first portion of the combined stream through the bifurcating passage;
discharging a second portion of the combined stream through a main discharge, the main discharge including a main discharge resistance; and
varying the main discharge resistance using a main discharge multiplexer to establish a threshold occlusion level below which causes cells of the of the combined stream to deform and enter the bifurcating passage.

9. The method of claim 8, further comprising:
varying, selectively, at least one of the bifurcating flow resistance using a bifurcating passage multiplexer or the main discharge resistance using the main discharge multiplexer to establish a selection width upstream of the bifurcating passage to align the acinar cells and the islet cells with the bifurcating passage.

10. The method of claim 9, further comprising:
establishing a pinch width of the sampling stream using the focusing stream upstream of the selection width to direct the acinar cells and the islet cells with the selection width.

11. The method of claim 10, wherein the passage width of the bifurcating passage is 80% of a width or diameter of the acinar cells and the islet cells.

12. The method of claim 10, further comprising:
holding an islet cell at an inlet of the bifurcating passage.

13. The method of claim 12, further comprising:
collecting the held islet cell from the inlet of the bifurcating passage through the main discharge by adjusting at least one of the bifurcating flow resistance using a bifurcating passage multiplexer or the main discharge resistance using the main discharge multiplexer.

14. The method of claim 13, wherein the upstream passage is configured to deliver the focusing stream at a laminar flow rate and the sample passage is configured to deliver the stream flow at a laminar flow rate.

15. The method of claim 13, further comprising:
separating acinar from islets, separating large islets from small islets, and separating viable islets from non-viable islets by varying the main discharge resistance.

16. The method of claim 13, further comprising:
producing a main discharge signal as a function of a sensed condition of the main discharge;
producing a bifurcating passage signal as a function of a sensed condition of a bifurcating passage; and
operating the main discharge multiplexer and a bifurcating passage multiplexer as a function of one or more of the main discharge signal and the bifurcating passage signal.

17. A method of operating microfluidic device to separate acinar cells from islet cells, the method comprising:
providing a sample stream including islet cells and acinar cells from an upstream sampling passage into a combining passage;
providing a focusing stream from an upstream focusing passage to the combining passage to, together with the sample stream, form a combined stream, the focusing stream directing the islet cells and acinar cells toward a bifurcating passage that defines a bifurcating flow resistance and that defines a passage width and depth;

discharging a first portion of the combined stream including the islet cells through a main discharge, the main discharge including a main discharge resistance; and varying the main discharge resistance using a main discharge multiplexer to cause acinar cells of the of the combined stream to deform and enter the bifurcating passage.

18. The method of claim 17, further comprising:

varying, selectively, at least one of the bifurcating flow resistance using a bifurcating passage multiplexer or the main discharge resistance using the main discharge multiplexer to establish a selection width upstream of the bifurcating passage to align the acinar cells and the islet cells with the bifurcating passage; and establishing a pinch width of the sampling stream using the focusing stream upstream of the selection width to direct the acinar cells and the islet cells with the selection width.

19. The method of claim 18, further comprising:

holding an islet cell at an inlet of the bifurcating passage.

20. The method of claim 19, further comprising:

collecting the held islet cell from the inlet of the bifurcating passage through the main discharge by adjusting at least one of the bifurcating flow resistance using a bifurcating passage multiplexer or the main discharge resistance using the main discharge multiplexer.

* * * * *